US010552435B2

(12) United States Patent
Wang et al.

(10) Patent No.: US 10,552,435 B2
(45) Date of Patent: Feb. 4, 2020

(54) FAST APPROXIMATE RESULTS AND SLOW PRECISE RESULTS

(71) Applicant: Microsoft Technology Licensing, LLC, Redmond, WA (US)

(72) Inventors: Chi Wang, Redmond, WA (US); Bolin Ding, Redmond, WA (US); Danyel A. Fisher, Seattle, WA (US); Robyn Dominik Moritz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/453,690

(22) Filed: Mar. 8, 2017

(65) Prior Publication Data

US 2018/0260450 A1    Sep. 13, 2018

(51) Int. Cl.
*G06F 16/30* (2019.01)
*G06F 16/248* (2019.01)

(52) U.S. Cl.
CPC .................. *G06F 16/248* (2019.01)

(58) Field of Classification Search
CPC .................. G06F 16/248; G06F 2203/04803
See application file for complete search history.

(56) References Cited

U.S. PATENT DOCUMENTS

| | | | |
|---|---|---|---|
| 5,878,426 A | 3/1999 | Plasek et al. | |
| 6,052,689 A | 4/2000 | Muthukrishnan et al. | |
| 6,108,658 A | 8/2000 | Lindsay et al. | |
| 6,477,534 B1 | 11/2002 | Acharya et al. | |
| 6,504,195 B2 | 1/2003 | Guidash | |
| 6,760,724 B1 | 7/2004 | Chakrabarti et al. | |
| 6,842,753 B2 | 1/2005 | Chaudhuri et al. | |

(Continued)

FOREIGN PATENT DOCUMENTS

| | | |
|---|---|---|
| CN | 101551745 A | 10/2009 |
| WO | 2014011708 A2 | 1/2014 |

(Continued)

OTHER PUBLICATIONS

Article entitled "Getting Started with LabChart for teaching", Copyright 2014, by LabChart.*

(Continued)

*Primary Examiner* — Mahesh H Dwivedi
(74) *Attorney, Agent, or Firm* — Schwegman Lundberg & Woessner, P.A.

(57) ABSTRACT

Techniques for presenting data visualizations are described. Consistent with some embodiments of the present invention, a data visualization system includes an approximate query engine to derive approximate query results and present approximate data visualizations, in interactive time. The data visualization system also includes a precise query engine, thereby enabling a data analyst to selectively request that a precise query result be generated for a specific query, so that the data analyst can confirm a data observation made when viewing the approximate visualization for that specific query. The precise visualization is presented in a manner that allows the data analyst to view, and thus confirm or disprove, a data observation recorded when viewing the approximate visualization, and also compare the precise visualization with the previously generated and presented approximate visualization.

18 Claims, 5 Drawing Sheets

(56) References Cited

U.S. PATENT DOCUMENTS

| | | | |
|---|---|---|---|
| 7,182,465 B2 | 2/2007 | Fuchs et al. | |
| 7,385,708 B2 | 6/2008 | Ackerman et al. | |
| 7,536,396 B2 | 5/2009 | Johnson et al. | |
| 7,567,949 B2 | 7/2009 | Chaudhuri et al. | |
| 7,636,707 B2 | 12/2009 | Chaudhuri et al. | |
| 7,650,331 B1 | 1/2010 | Dean et al. | |
| 7,716,215 B2 | 5/2010 | Lohman et al. | |
| 7,728,868 B2 | 6/2010 | Razzaque et al. | |
| 7,877,381 B2 | 1/2011 | Ewen et al. | |
| 7,882,138 B1 | 2/2011 | Kumar | |
| 7,890,444 B2 | 2/2011 | Torres et al. | |
| 8,032,554 B2 | 10/2011 | Nishizawa et al. | |
| 8,090,730 B2 | 1/2012 | Shahabi et al. | |
| 8,484,243 B2 | 7/2013 | Krishnamurthy et al. | |
| 8,553,034 B2 | 10/2013 | Wong et al. | |
| 8,572,068 B2 | 10/2013 | Graefe et al. | |
| 8,959,651 B2 | 2/2015 | Li et al. | |
| 8,983,936 B2 | 3/2015 | Fisher et al. | |
| 9,436,740 B2 | 9/2016 | Fisher et al. | |
| 9,607,045 B2 | 3/2017 | Fisher et al. | |
| 2004/0002956 A1* | 1/2004 | Chaudhuri | G06F 16/2456 |
| 2004/0249810 A1 | 12/2004 | Das et al. | |
| 2005/0182558 A1 | 8/2005 | Maruta | |
| 2006/0031209 A1 | 2/2006 | Ahlberg et al. | |
| 2006/0074882 A1* | 4/2006 | Scherer | G06F 16/2462 |
| 2006/0106793 A1 | 5/2006 | Liang | |
| 2007/0016612 A1 | 1/2007 | James et al. | |
| 2007/0226178 A1 | 9/2007 | Ewen et al. | |
| 2008/0072180 A1 | 3/2008 | Chevalier et al. | |
| 2008/0077530 A1 | 3/2008 | Banas et al. | |
| 2008/0250357 A1 | 10/2008 | Lee et al. | |
| 2008/0306919 A1 | 12/2008 | Iwayama et al. | |
| 2009/0187467 A1 | 7/2009 | Fang et al. | |
| 2009/0228434 A1 | 9/2009 | Krishnamurthy et al. | |
| 2009/0252404 A1 | 10/2009 | Lecerf | |
| 2009/0271529 A1 | 10/2009 | Kashiyama et al. | |
| 2009/0322754 A1 | 12/2009 | Robertson et al. | |
| 2009/0322756 A1 | 12/2009 | Robertson et al. | |
| 2010/0225661 A1 | 9/2010 | Gorisch et al. | |
| 2010/0241646 A1 | 9/2010 | Friedman et al. | |
| 2010/0268067 A1 | 10/2010 | Razzaque et al. | |
| 2011/0047120 A1 | 2/2011 | Kamvar et al. | |
| 2011/0084967 A1 | 4/2011 | De pauw et al. | |
| 2011/0167110 A1 | 7/2011 | Hoffberg et al. | |
| 2011/0258183 A1* | 10/2011 | Gibbs | G06F 16/3322 707/723 |
| 2011/0302164 A1 | 12/2011 | Krishnamurthy et al. | |
| 2011/0310112 A1 | 12/2011 | Zolotovitski | |
| 2011/0314021 A1 | 12/2011 | Gibbs et al. | |
| 2012/0047125 A1 | 2/2012 | Day et al. | |
| 2012/0047128 A1 | 2/2012 | Shepherd et al. | |
| 2012/0054173 A1 | 3/2012 | Andrade et al. | |
| 2012/0078904 A1 | 3/2012 | Agrawal et al. | |
| 2012/0078939 A1 | 3/2012 | Chen et al. | |
| 2012/0089642 A1 | 4/2012 | Milward et al. | |
| 2012/0158708 A1 | 6/2012 | Gillet et al. | |
| 2012/0246102 A1 | 9/2012 | Sudharsan | |
| 2012/0311581 A1 | 12/2012 | Balmin et al. | |
| 2013/0030860 A1 | 1/2013 | Chaubey et al. | |
| 2013/0046756 A1 | 2/2013 | Hao et al. | |
| 2013/0117257 A1 | 5/2013 | Meijer et al. | |
| 2013/0124097 A1 | 5/2013 | Thorne | |
| 2013/0179466 A1 | 7/2013 | Mizobuchi et al. | |
| 2013/0194271 A1 | 8/2013 | Roesch et al. | |
| 2013/0268520 A1* | 10/2013 | Fisher | G06F 16/248 707/723 |
| 2014/0019352 A1 | 1/2014 | Shrivastava | |
| 2014/0082178 A1 | 3/2014 | Boldyrev et al. | |
| 2014/0095525 A1 | 4/2014 | Hsiao et al. | |
| 2014/0164348 A1* | 6/2014 | Reed | G06F 16/9577 707/708 |
| 2014/0195558 A1* | 7/2014 | Murthy | G06F 16/2471 707/770 |
| 2014/0222826 A1 | 8/2014 | Dacosta et al. | |
| 2014/0372438 A1 | 12/2014 | Chandramouli et al. | |
| 2015/0269228 A1 | 9/2015 | Fisher et al. | |
| 2017/0154098 A1 | 6/2017 | Fisher et al. | |
| 2017/0228425 A1* | 8/2017 | Kandula | G06N 7/005 |
| 2017/0262635 A1 | 9/2017 | Strauss et al. | |
| 2017/0371924 A1 | 12/2017 | Ding et al. | |

FOREIGN PATENT DOCUMENTS

| | | |
|---|---|---|
| WO | 2014200877 A1 | 12/2014 |
| WO | 2015138497 A2 | 9/2015 |

OTHER PUBLICATIONS

Article entitled "Bing vs. Google: Comparing them Side-by-side", dated Aug. 14, 2009, by Dean.*

Article entitled "Graphing with Excel", dated May 16, 2005, by LabWrite.*

Zeng, et al., "ABS: a System for Scalable Approximate Queries with Accuracy Guarantees", In Proceedings of the 2014 ACM SIGMOD International Conference on Management of Data, Jun. 22, 2014, pp. 1067-1070.

Su, et al., "Approximate Aggregates in Oracle 12C", In Proceedings of the 25th ACM International on Conference on Information and Knowledge Management, Oct. 24, 2016, pp. 1603-1612.

Zhang, Donghui, "Advanced Database Aggregation Query Processing", In Proceedings of EDBT PhD Workshop, Mar. 28, 2002, 4 pages.

Chaudhuri, et al., "Optimized Stratified Sampling for Approximate Query Processing", In Journal of ACM Transactions on Database Systems, vol. 32, Issue 2, Jun. 1, 2007, pp. 1-58.

Agarwal, et al., "Knowing when you're Wrong: Building Fast and Reliable Approximate Query Processing Systems", In Proceedings of the ACM SIGMOD International Conference on Management of Data, Jun. 22, 2014, pp. 481-492.

Agarwal, et al., "BlinkDB: Queries with Bounded Errors and Bounded Response Times on Very Large Data", In Proceedings of the 8th ACM European Conference on Computer Systems, Apr. 15, 2013, pp. 29-42.

Bostock, et al., "D3 Data-Driven Documents", In Proceedings of IEEE Transactions on Visualization and Computer Graphics, vol. 17, Issue 12, Dec. 2011, 9 pages.

Budiu, et al., "Interacting with large distributed datasets using Sketch", In Proceedings of Eurographics Symposium on Parallel Graphics and Visualization, May 25, 2015, 13 pages.

Card, et al., "The information visualizer, an information workspace", In Proceedings of the SIGCHI Conference on Human Factors in Computing Systems, Apr. 27, 1991, 181-188 pages.

Chaudhuri, et al., "An Overview of Data Warehousing and OLAP Technology", In Journal of ACM SIGMOD Record, vol. 26, Issue 1, Mar. 1997, 10 pages.

Cumming, et al., "Inference by Eye: Confidence Intervals and How to Read Pictures of Data", In Journal of American Psychologist, vol. 60, No. 2, Feb. 2005, pp. 170-180.

Ding, et al., "Sample + Seek: Approximating Aggregates with Distribution Precision Guarantee", In Proceedings of the International Conference on Management of Data, Jun. 26, 2016, pp. 679-694.

Elmqvist, et al., "Hierarchical Aggregation for Information Visualization: Overview, Techniques, and Design Guidelines", In Journal of IEEE Transactions on Visualization and Computer Graphics, vol. 16, Issue 3, May, 2010, pp. 439-454.

Fekete, et al., "Progressive Analytics: A Computation Paradigm for Exploratory Data Analysis", In Proceedings of Computer Research Repository, Jul. 2016, 10 pages.

Ferreira, et al., "Sample-oriented task-driven visualizations: Allowing users to make better, more confident decisions", In Proceedings of the SIGCHI Conference on Human Factors in Computing Systems, Apr. 26, 2014, pp. 571-580.

Fisher, Danyel, "Big Data Exploration Requires Collaboration between Visualization and Data Infrastructures", In Proceedings of the Workshop on Human-In-the-Loop Data Analytics, Jun. 26, 2016, 5 pages.

(56) References Cited

OTHER PUBLICATIONS

Fisher, et al., "Trust me, I'm partially right: incremental visualization lets analysts explore large datasets faster", In Proceedings of the SIGCHI Conference on Human Factors in Computing Systems, May 5, 2012, pp. 1673-1682.
Godfrey, et al., "Interactive Visualization of Large Data Sets", In Proceedings of IEEE Transactions on Knowledge and Data Engineering, vol. 28, No. 8, Aug. 2016, pp. 2142-2157.
Gray, et al., "Data cube: A relational aggregation operator generalizing group-by, cross-tab, and sub-totals", In Journal of Data Mining and Knowledge Discovery, vol. 1, Issue 1, Mar. 1997, 5 pages.
Heer, et al., "Graphical histories for visualization: Supporting analysis, communication, and evaluation", In IEEE transactions on visualization and computer graphics, vol. 14, Issue 6, Nov. 2008, pp. 1189-1196.
Hellertein, et al., "Interactive Data Analysis: The Control Project", In Journal of Computer, vol. 32, Issue 8, Aug. 1999, pp. 51-59.
Hellerstein, et al., "Online aggregation", In Proceedings of the ACM SIGMOD Record, vol. 26, Issue 2, Jun. 1997, pp. 171-182.
Hullman, et al., "Hypothetical Outcome Plots Outperform Error Bars and Violin Plots for Inferences about Reliability of Variable Ordering", In PloS one, vol. 10, Issue 11, Nov. 16, 2015, 36 pages.
Joslyn, et al., "Decisions with uncertainty: the glass half full", In Journal of Current Directions in Psychological Science, vol. 22, Issue 4, Aug. 1, 2013, 3 pages.
Kamat, et al., "Distributed and interactive cube exploration", In Proceedings of IEEE 30th International Conference on Data Engineering, Mar. 31, 2014, 12 pages.
Lins, et al., "Nanocubes for real-time exploration of spatiotemporal datasets", In IEEE Transactions on Visualization and Computer Graphics, vol. 19, Issue 12, Dec. 2013, 10 pages.
Liu, et al., "The effects of interactive latency on exploratory visual analysis", In IEEE transactions on visualization and computer graphics, vol. 20, Issue 12, Dec. 2014, 10 pages.
Liu, et al., "imMens: Real-time Visual Querying of Big Data", In Publication of Wiley Online Library, Jun. 1, 2013, 4 pages.
Jerzy Neyman, "Outline of a theory of statistical estimation based on the classical theory of probability", In Publication of Royal Society, Aug. 30, 1937, 48 pages.
Nielsen, Jakob, "Response times: The 3 important limits", In Book of Usability Engineering, Jan. 1, 1993, 7 pages.
North, Chris, "Toward measuring visualization insight", In Journal of IEEE Computer Graphics and Applications, vol. 26, Issue 3, May 1, 2006, pp. 20-23.
"Airline Delays, Cancellations and Tarmac Times", http://www.rita.dot.gov/bts/data_and_statistics/by_mode/airline_and_and_airports/airline_delay_html, Retrieved on: Dec. 15, 2016, 2 pages.
Olken, et al., "Simple Random Sampling from Relational Databases", In Proceedings of the Twelfth International Conference on Very Large Data Bases, Aug. 1986, pp. 160-169.
Olston, et al., "Visualizing data with bounded uncertainty", In Proceedings of the IEEE Symposium on Information Visualization, Oct. 28, 2002, pp. 1-8.
Perrot, et al., "Large interactive visualization of density functions on big data", In Proceedings of 5th IEEE Symposium on Large Data Analysis and Visualization, Oct. 2015, 9 pages.
Pezzotti, et al., "Approximated and User Steerable tSNE for Progressive Visual Analytics", In Journal of IEEE Transactions on Visualization and Computer Graphics, Dec. 2015, pp. 1-15.
Pirolli, et al., "The sensemaking process and leverage points for analyst technology as identified through cognitive task analysis", In Proceedings of international conference on intelligence analysis, vol. 5, May 2, 2005, 6 pages.
Stasko, et al., "Jigsaw: supporting investigative analysis through interactive visualization", In Journal of Information Visualization, vol. 7, Issue 2, Summer, 2008, pp. 118-132.
Stolper, et al., "Progressive visual analytics: User-driven visual exploration of in-progress analytics", In Journal of IEEE transactions on visualization and computer graphics, vol. 20, Issue 12, Dec. 31, 2014, 10 pages.
Stolte, et al., "Polaris: A system for query, analysis, and visualization of multidimensional relational databases", In Journal of IEEE Transactions on Visualization and Computer Graphics, vol. 8, Issue 1, Jan. 2002, 10 pages.
John W. Tukey, "Exploratory data analysis", In Publication of Pearsonl, Jan. 1977, pp. 5-23.
Wickham, Hadley, "Bin-summarise-smooth: A framework for visualising large data", In technical Report of Clarkson University, Oct. 13, 2013, 9 pages.
Wongsuphasawat, et al., "Voyager: Exploratory Analysis via Faceted Browsing of Visualization Recommendations", In Journal of IEEE Transactions on Visualization and Computer Graphics, vol. 22, Issue 1, Jan. 2016, 10 pages.
Yi, et al., "Understanding and characterizing insights: how do people gain insights using information visualization?", In Proceedings of the Workshop on beyond time and errors: novel Evaluation methods for Information Visualization, Apr. 5, 2008, pp. 1-6.
"Database SQL Tuning Guide", https://docs.oracle.com/database/121/TGSQL/tgsql_histo.htm, Retrieved on: Dec. 16, 2016, 22 pages.
Wickham, et al., "40 years of boxplots", http://vita.had.co.nz/papers/boxplots.pdf, Published on: Nov. 29, 2011, pp. 1-17.
U.S. Appl. No. 15/192,909, Ding, et al., "Approximating Aggregate Queries with Distribution Precision Guarantee", filed Jun. 24, 2016.
"Airline On-Time Performance and Causes of Flight Delays", Retrieved From: https://web.archive.org/web/20120109030043/http://explore.data.gov/Transportation/Airline-On-Time-Performance-and-Causes-of-Flight-D/ar4r-an9z, Retrieved Date: Apr. 4, 2012, 1 Page.
"Hadoop", Retrieved From http://hadoop.apache.org/, Retrieved Date: Aug. 17, 2015, 3 Pages.
"LINQ (Language-Integrated Query)", In Proceedings of the LINQ Project, Visual Studio, 2010, 26 Pages.
"LINQ (Language-Integrated Query)", Retrieved From https://web.archive.org/web/20160221212347/https://msdn.microsoft.com/library/bb397926.aspx, Retrieved Date: Feb. 22, 2013, 1 Page.
"Open Directory Project", Retrieved From https://web.archive.org/web/*/http://dmoz.org, Retrieved Date: Dec. 18, 2012, 1 Page.
"Process Progress Dialog Box (Analysis Services—Multidimensional Data)", Retrieved From: https://technet.microsoft.com/en-us/library/ms190131(v=sql.110).aspx, Retrieved Date: Feb. 20, 2013, 2 Pages.
"StreamInsight", Retrieved From: http://www.microsoft.com/sqlserver/en/us/solutions-technologies/business-intelligence.com, Aug. 30, 2012, 2 Pages.
"Uncertainty Visualization", Retrieved From: http://spatialanalyst.net/wiki/index.php?title=Uncertainty_visualization, Retrieved Date: Jan. 11, 2012, 11 Pages.
"Final Office Action Issued in U.S. Appl. No. 13/439,563", dated Nov. 1, 2013, 8 Pages.
"Non-Final Office Action Issued in U.S. Appl. No. 13/439,563", dated May 9, 2014, 10 Pages.
"Non-Final Office Action Issued in U.S. Appl. No. 13/439,563", dated May 14, 2013, 7 Pages.
"Notice of Allowance Issued in U.S. Appl. No. 13/439,563", dated Oct. 28, 2014, 9 Pages.
"RCE and Amendment Filed in U.S. Appl. No. 13/439,563", filed Feb. 3, 2014, 13 Pages.
"Response to Non-Final Office Action Filed in U.S. Appl. No. 13/439,563", filed Sep. 12, 2013, 9 Pages.
"Response to Non-Final Office Action Filed in U.S. Appl. No. 13/439,563", filed Aug. 11, 2014, 9 Pages.
"Advisory Action Issued in U.S. Appl. No. 13/439,650", dated Jun. 10, 2016, 3 Pages.
"Final Office Action Issued in U.S. Appl. No. 13/439,650", dated Feb. 12, 2016, 6 Pages.
"Non-Final Office Action Issued in U.S. Appl. No. 13/439,650", dated Jun. 16, 2014, 33 Pages.
"Non-Final Office Action Issued in U.S. Appl. No. 13/439,650", dated May 21, 2015, 5 Pages.
"Notice of Allowance Issued in U.S. Appl. No. 13/439,650", dated Jul. 29, 2016, 14 Pages.
"Notice of Allowance Issued in U.S. Appl. No. 13/439,650", dated Jan. 20, 2015, 9 Pages.

(56) References Cited

OTHER PUBLICATIONS

"Notice of Appeal and Pre-Appeal Brief Request Issued in U.S. Appl. No. 13/439,650", filed Jun. 30, 2016, 9 Pages.
"Notice of Panel Decision from Pre-Appeal Brief Review Issued in U.S. Appl. No. 13/439,650", dated Jul. 13, 2016, 2 Pages.
"Response to Final Office Action Filed in U.S. Appl. No. 13/439,650", filed May 3, 2016, 11 Pages.
"Response to Non-Final Office Action Filed in U.S. Appl. No. 13/439,650", filed Nov. 4, 2015, 14 Pages.
"Response to Non-Final Office Action Filed in U.S. Appl. No. 13/439,650", filed Sep. 16, 2014, 19 Pages.
"Applicant-Initiated Interview Summary from U.S. Appl. No. 13/723,224", dated Nov. 15, 2016, 4 pages.
"Applicant-Initiated Interview Summary from U.S. Appl. No. 13/723,224", dated Apr. 25, 2016, 3 Pages.
"Final Office Action Issued in U.S. Appl. No. 13/723,224", dated Sep. 16, 2016, 11 Pages.
"Final Office Action Issued in U.S. Appl. No. 13/723,224", dated Feb. 24, 2016, 17 Pages.
"Non-Final Office Action Issued in U.S. Appl. No. 13/723,224", dated Oct. 14, 2015, 10 Pages.
"Non-Final Office Action Issued in U.S. Appl. No. 13/723,224", dated Jul. 9, 2015, 9 Pages.
"Non-Final Office Action Issued in U.S. Appl. No. 13/723,224", dated May 23, 2016, 11 Pages.
"Notice of Allowance Issued in U.S. Appl. No. 13/723,224", dated Nov. 23, 2016, 7 Pages.
"Response to the Final Office Action from U.S. Appl. No. 13/723,224", dated Nov. 10, 2016, 10 Pages.
"Response to the Final Office Action from U.S. Appl. No. 13/723,224", dated Apr. 29, 2016, 9 Pages.
"Response to the Non-Final Office Action from U.S. Appl. No. 13/723,224", dated Aug. 16, 2016, 10 Pages.
"Response to the Non-Final Office Action from U.S. Appl. No. 13/723,224", filed Sep. 21, 2015, 8 Pages.
"Response to the Non-Final Office Action from U.S. Appl. No. 13/723,224", dated Jan. 6, 2016, 11 Pages.
"Amendment and Response to Non-Final Office Action Filed in U.S. Appl. No. 13/915,632", filed Jun. 12, 2015, 14 Pages.
"Amendment and Response to Notice to File Corrected Application Papers Filed in U.S. Appl. No. 13/915,632", filed Sep. 3, 2013, 95 Pages.
"Final Office Action Issued in U.S. Appl. No. 13/915,632", dated Aug. 6, 2015, 11 Pages.
"Non-Final Office Action Issued in U.S. Appl. No. 13/915,632", dated Mar. 12, 2015, 10 Pages.
"Notice of Allowance Issued in U.S. Appl. No. 13/915,632", dated Apr. 13, 2016, 9 Pages.
"Notice of Allowance Issued in U.S. Appl. No. 13/915,632", dated Aug. 22, 2016, 10 Pages.
"Response to Final Office Action Filed in U.S. Appl. No. 13/915,632", filed Feb. 3, 2016, 23 Pages.
"Office Action Issued in European Patent Application No. 13740442.2", dated May 29, 2017, 9 Pages.
"Oral Hearing Issued in European Patent Application No. 13740442.2", dated Apr. 26, 2018, 8 Pages.
"Response filed to Office Action of European Patent Application No. 13740442.2", dated Jul. 14, 2017, 15 Pages.
"Final Office Action Issued in U.S. Appl. No. 15/432,270", dated Nov. 17, 2017, 16 Pages.
"Non Final Office Action Issued in U.S. Appl. No. 15/432,270", dated Mar. 30, 2018, 8 Pages.
"Non final Office Action Issued in U.S. Appl. No. 15/432,270", dated Sep. 5, 2017, 12 Pages.
"Office Action and Search Report Issued in Chinese Patent Application No. 201380037221.X", dated Feb. 17, 2017, 13 Pages.
"Second Office Action Issued in Chinese Patent Application No. 201380037221.X", dated Oct. 27, 2017, 10 Pages.
"Third Office Action Issued in Chinese Patent Application No. 201380037221.X", dated Mar. 9, 2018, 7 Pages.

"Voluntary Amendment Issued in Chinese Patent Application No. 201380037221.X", Filed Date: Jul. 1, 2015, 7 Pages.
"Voluntary Amendment filed in Chinese Patent Application No. 201480033884.9", dated Jul. 28, 2016, 14 Pages.
"Response filed to the First Office Action of Chinese Patent Application No. 21380037221.X", dated Jun. 23, 2017, 12 Pages.
Abadi, et al., "The Design of the Borealis Stream Processing Engine", In Proceedings of the Second Biennial Conference on Innovative Data Systems Research, Jan. 2005, 13 Pages.
Acharya, et al., "Congressional Samples for Approximate Answering of Group-by Queries", In Proceedings of the ACM SIGMOD International Conference on Management of Data, May 16, 2000, pp. 487-498.
Acharya, et al., "Fast and Near-Optimal Algorithms for Approximating Distributions by Histograms", In Proceedings of the 34th ACM Symposium on Principles of Database Systems, May 31, 2015, pp. 249-263.
Acharya, et al., "Join Synopses for Approximate Query Answering", In Proceedings of the ACM SIGMOD International Conference on Management of Data, Jun. 1, 1999, pp. 275-286.
Acharya, et al., "The Aqua Approximate Query Answering System", In Proceedings of the ACM SIGMOD international Conference on Management, Jun. 1, 1999, pp. 574-576.
Agarwal, et al., "Automated Selection of Materialized Views and Indexes in SQL Databases", In Proceedings of the 6th International Conference on Very Large Data Bases, Sep. 10, 2000, pp. 496-505.
Ali, et al., "Microsoft CEP Server and Online Behavioral Targeting", In Proceedings of the VLDB Endowment, vol. 2, Issue 2, Aug. 24, 2009, 4 Pages.
Babcock, et al., "Dynamic Sample Selection for Approximate Query Processing", In Proceedings of the ACM SIGMOD International Conference on Management of Data, Jun. 9, 2003, pp. 539-550.
Babcock, et al., "Models and Issues in Data Stream Systems", In Proceedings of the twenty-first ACM SIGMOD-SIGACT-SIGART symposium on Principles of database systems, Jun. 3, 2002, 16 Pages.
Bain, William, "Using In-Memory Computing to Simplify Big Data Analytics", Retrieved From: http://www.datanami.com/datanami/2012-10-02/using_in-memory_computing_to_simplify_big_data_analytics.html, Retrieved Date: Feb. 20, 2013, 5 Pages.
Balazinska, et al., "Fault-Tolerance in the Borealis Distributed Stream Processing System", In Proceedings of the ACM SIGMOD International Conference on Management of Data, Jun. 14-16, 2005, 12 Pages.
Barga, et al., "Consistent Streaming Through Time: A Vision for Event Stream Processing", In Proceedings of the 3rd Biennial Conference on Innovative Data Systems Research, Jan. 10, 2007, 12 Pages.
Barga, et al., "Daytona: Iterative MapReduce on Windows Azure", Retrieved From: https://web.archive.org/web/20151213132253/http://research.microsoft.com/en-us/projects/daytona/, Retrieved Date: Sep. 19, 2013, 4 Pages.
Barga, et al., "Iterative MapReduce Research on Azure", In Proceedings of the International Conference for High Performance Computing, Networking, Storage and Analysis, Nov. 12, 2011, 1 Page.
Barnett, et al., "Stat!—An Interactive Analytics Environment for Big Data", In Proceedings of the ACM SIGMOD International Conference on Management of Data, Jun. 22-27, 2013, 4 Pages.
Baudisch, et al., "Phosphor: Explaining Transitions in the User Interface Using Afterglow Effects", In Proceedings of the 19th Annual ACM Symposium on User Interface Software and Technology, Oct. 15, 2006, pp. 169-178.
Bille, et al., "Fast Evaluation of Union-Intersection Expressions", In Proceedings of 18th International Symposium on Algorithms and Computation, Dec. 17, 2007, pp. 1-16.
Bose, et al., "Beyond Online Aggregation: Parallel and Incremental Data Mining with Online Map-Reduce", In Proceedings of the ACM Workshop on Massive Data Analytics on the Cloud, Apr. 26, 2010, 6 Pages.

(56) References Cited

OTHER PUBLICATIONS

Chaiken, et al., "SCOPE: Easy and Efficient Parallel Processing of Massive Data Sets", In Proceedings of the Very Large Data Bases Endowment, vol. 1, Issue 2, Aug. 24, 2008, pp. 1-12.
Chakrabarti, et al., "Approximate Query Processing Using Wavelets", In International Journal on Very Large Data Bases, vol. 10, Issue 2-3, Sep. 2001, pp. 199-223.
Chan, et al. "Maintaining Interactivity While Exploring Massive Time Series", In Proceedings of IEEE Symposium on Visual Analytics Science and Technology, Oct. 19, 2008, 8 Pages.
Chandramouli, et al., "Scalable Progressive Analytics on Big Data in the Cloud", In Proceedings of the Very Large Data Bases Endowment, vol. 6, Issue 14, Sep. 2013, pp. 1726-1737.
Chandramouli, et al., "Temporal Analytics on Big Data for Web Advertising", In Proceedings of the IEEE 28th International Conference on Data Engineering, Apr. 5, 2012, pp. 90-101.
Chang, et al., "Bigtable: A Distributed Storage System for Structured Data", In Proceedings of the 7th Conference on USENIX Symposium on Operating Systems Design and Implementation, vol. 7, Nov. 6, 2006, 14 Pages.
Charikar, et al., "Towards Estimation Error Guarantees for Distinct Values", In Proceedings of the Nineteenth ACM-SIGMOD-SIGACT-SIGART Symposium on Principles of Database Systems, May 1, 2000, pp. 268-279.
Chaudhuri, et al., "A Robust, Optimization-Based Approach for Approximate Answering of Aggregate Queries", In Proceedings of the ACM SIGMOD International Conference on Management of Data, May 21, 2001, pp. 295-306.
Chaudhuri, et al., "Effective Use of Block-Level Sampling in Statistics Estimation", In Proceedings of the ACM SIGMOD International Conference on Management of Data, Jun. 13-18, 2004, 12 Pages.
Chaudhuri, et al., "On Random Sampling Over Joins", In Proceedings of the ACM SIGMOD International Conference on Management of Data, May 31, 1999, 12 Pages.
Chaudhuri, et al., "Overcoming limitations of sampling for aggregation queries", In Proceedings of 17th International Conference on Data Engineering, Apr. 2, 2001, pp. 534-542.
Chen, et al., "Large-Scale Behavioral Targeting", In Proceedings of the 15th ACM SIGKDD International Conference on Knowledge Discovery and Data Mining, Jun. 28, 2009, 9 Pages.
Codd, Edgar F., "A Relational Model of Data for Large Shared Data Banks", In Proceedings of the Communications of the ACM, vol. 13, Issue 6, Jun. 1970, pp. 377-387.
Cohn, et al., "Improving Generalization with Active Learning", In Proceedings of the Machine Learning, vol. 15, Issue 2, May 1994, 21 Pages.
Condie, et al., "MapReduce Online", In Proceeding of the 7th USENIX Symposium on Networked Systems Design and Implementation, Apr. 28, 2010, 15 Pages.
Zuk, et al."Visualization of Uncertainty and Reasoning", In Proceedings of the 8th International Symposium on Smart Graphics, 2007, 14 Pages.
Correa, et al., "A Framework for Uncertainty-Aware Visual Analytics", In Proceedings of the IEEE Symposium on Visual Analytics Science and Technology, Oct. 12, 2009, pp. 51-58.
Cottam, et al., "Bit by Bit: Incremental Data Visualization", In Proceedings of the IEEE Symposium on Information Visualization, Oct. 19, 2008, 2 Pages.
Das, et al., "Google News Personalization: Scalable Online Collaborative Filtering", In Proceedings of the 16th ACM International Conference on World Wide Web, May 8, 2007, 10 Pages.
Dean, et al., "Mapreduce: Simplified Data Processing on Large Clusters", In Proceedings of the USENIX Association 6th Symposium on Operating Systems Design and Implementation, Dec. 6, 2004, pp. 137-149.
Deligiannidis, et al., "User-Centered Incremental Data Exploration and Visualization", In Proceedings of the Technical Report, LSDIS Lab and Computer Science, The University of Georgia, 2006, 10 Pages.

Diao, Yanlei, "Scalable, Low-Latency Data Analytics and its Applications", Retrieved From: http://www.comp.hkbu.edu.hk/v1/file/seminar/20120117_Diao-2012public.pdf, Retrieved Date: Feb. 20, 2013, 29 Pages.
Dobra, et al., "Processing Complex Aggregate Queries Over Data Streams", In Proceedings of the ACM SIGMOD International Conference on Management of Data, Jun. 4, 2002, pp. 61-72.
Doucet, et al., "Efficient Block Sampling Strategies for Sequential Monte Carlo Methods", In Journal of Computational and Graphical Statistics, vol. 15, Issue 3, Sep. 2006, 19 Pages.
Esty, et al., "The Box-Percentile Plot", In Journal of Statistical Software, vol. 8, Issue 17, 2003, pp. 1-14.
Fisher, et al., "Exploratory Visualization Involving Incremental, Approximate Database Queries and Uncertainty", In Proceedings of the IEEE Computer Graphics and Applications, vol. 32, Issue 4, Jul. 2012, 8 Pages.
Fisher, Danyel, "Hotmap: Looking at Geographic Attention", In Proceedings of the Transactions on Visualization and Computer Graphics, vol. 13, Issue 6, Nov. 2007, 8 Pages.
Fisher, Danyel, "Incremental, Approximate Database Queries and Uncertainty for Exploratory Visualization", In Proceedings of the IEEE Symposium on Large Data Analysis and Visualization, Oct. 23, 2011, 8 Pages.
Fisher, et al., "U.S. Appl. No. 61/671,038", filed Jul. 12, 2012, 48 Pages.
Franklin, et al., "Continuous Analytics: Rethinking Query Processing in a Network-Effect World", In Proceedings of the CIDR, Jan. 4, 2009, 6 Pages.
Freedman, David A., "Statistical Models: Theory and Practice", Retrieved From: <<http://www.stat.berkeley.edu/~census/repgibson.pdf>>, Oct. 2005, 2 Pages.
Ganti, et al., "Icicles—Self-Tuning Samples for Approximate Query Answering", In Proceedings of the 26th International Conference on Very Large Data Bases, Sep. 10, 2000, pp. 176-187.
Ganti, et al., "Precomputing Search Features for Fast and Accurate Query Classification", In Proceedings of the Third ACM International Conference on Web Search and Data Mining, Feb. 4, 2010, 10 Pages.
Garofalakis, et al., "Approximate Query Processing—Taming the Terabytes", In Proceedings of 27th International Conference on Very Large Data Bases, Sep. 11, 2001, pp. 171-212.
Garrett, et al., "Real-Time Incremental Visualization of Dynamic Ultrasound vols. Using Parallel BSP Trees", In Proceedings of the 7th Conference on Visualization, Oct. 27-Nov. 1, 1996, 7 Pages.
Gates, et al., "Building a High-Level Dataflow System on Top of Map-Reduce: The Pig Experience", In Proceedings of the VLDB Endowment, vol. 2, Issue 2, Aug. 24, 2009, 12 Pages.
Ghemawat, et al., "The Google File System", In Proceedings of the 19th ACM SIGOPS Operating Systems Review, vol. 37, Issue 5, Oct. 19, 2003, pp. 29-43.
Gift, Noah, "Solve Cloud-Related Big Data Problems with MapReduce", Retrieved From: <<https://www.ibm.com/developerworks/cloud/library/cl-bigdata/cl-bigdata-pdtpdf>>, Nov. 8, 2010, 6 Pages.
Gilbert, et al., "Optimal and Approximate Computation of Summary Statistics for Range Aggregates", In Symposium on Principles of Database Systems May 21, 2001, pp. 227-236
Gilbert, George, "Real-time query for Hadoop democratizes access to big data analytics", Retrieved From: https://gigaom.com/report/real-time-query-for-hadoop-democratizes-access-to-big-data-analytics/, Oct. 22, 2012, 18 Pages.
Golab, et al., "Stream Warehousing with DataDepot", In Proceedings of the ACM SIGMOD International Conference on Management of data, Jun. 29-Jul. 2, 2009, 7 Pages.
Goldstein, et al., "Big Data Analytics: Temporal Semantics, Frameworks, and Applications", Work Performed During Internship at Microsoft Research, 16 Pages.
Graefe, Goetz, "The Cascades Framework for Query Optimization", In Proceedings of the IEEE Data Engineering Bulletin, vol. 18, Issue 3, Sep. 1995, pp. 19-28.
Grover, et al., "Extending Map-Reduce for Efficient Predicate-Based Sampling", In Proceedings of the IEEE 28th International Conference on Data Engineering, Apr. 1, 2012, 12 Pages.

(56) References Cited

OTHER PUBLICATIONS

Haas, et al., "Research Report, Join Algorithms for Online Aggregation", In Proceedings of the Research Report RJ 10126 (95001), IBM Almaden Research, Jun. 30, 1998, 42 Pages.
Haas, et al., "Ripple Joins for Online Aggregation", In Proceedings of the ACM SIGMOD International Conference on Management of Data, May 31-Jun. 3, 1999, 12 Pages.
Haas, et al., "The Need for Speed: Speeding Up DB2 UDB Using Sampling", In DUG Solutions Journal, vol. 10, Issue 2, Sep. 2003, 4 Pages.
Hall, et al., "Processing a Trillion Cells per Mouse Click", In Proceedings of the VLDB Endowment, vol. 5, Issue 11, Aug. 27, 2012, 11 Pages.
Hammad, et al., "Nile: A Query Processing Engine for Data Streams", In Proceedings of the 20th International Conference on Data Engineering, Mar. 30, 2004, 1 Page.
Harris, Derrick, "Cloudera makes SQL a first-class citizen in Hadoop", Retrieved From: http://gigaom.com/2012/10/24/cloudera-makes-sql-a-first-class-citizen-in-hadoop/, Oct. 24, 2012, 5 Pages.
He, et al., "Comet: Batched Stream Processing for Data Intensive Distributed Computing", In Proceedings of the 1st ACM Symposium on Cloud Computing, Jun. 10, 2010, 12 Pages.
Heer, et al., "Animated Transitions in Statistical Data Graphics", In Proceedings of the IEEE Transactions on Visualization and Computer Graphics, vol. 13, Issue 6, Nov. 2007, pp. 1240-1247.
Hellerstein, et al., "Informix under CONTROL: Online Query Processing", In Journal of Data Mining and Knowledge Discovery, vol. 4, Issue 4, Oct. 2000, 34 Pages.
Hoeffding, Wassily, "Probability Inequalities for Sums of Bounded Random Variables", In Journal of the American Statistical Association, vol. 58, Issue 301, Mar. 1963, 18 Pages.
Hu, et al., "Demographic Prediction Based on User's Browsing Behavior", In Proceedings of the ACM 16th International Conference on World Wide Web, May 8, 2007, 10 Pages.
Inoue, Tomohiro, "An Effective Technique and Practical Utility for Approximate Query Processing", In Master Thesis of Curtin University, Nov. 2015, 95 Pages.
Isard, Michael, "Dryad: Distributed Data-Parallel Programs from Sequential Building Blocks", In Proceedings of the 2nd ACM SIGOPS/EuroSys European Conference on Computer Systems, Mar. 21, 2007, 14 Pages.
Jackson, Christopher H., "Statistical Computing and Graphics: Displaying Uncertainty With Shading", In Proceedings of the American Statistician, vol. 62, Issue 4, 2002, 8 Pages.
Jensen, et al., "Temporal Specialization", In Proceedings of the Eighth International Conference on Data Engineering, Feb. 2, 1992, 10 Pages.
Jermaine, et al., "Scalable Approximate Query Processing With the DBO Engine", In Proceedings of the ACM Transactions on Database Systems, vol. 33, Issue 4, Nov. 2008, 12 Pages.
Jermaine, et al., "The Sort-Merge-Shrink Join", In Proceedings of the ACM Transactions on Database Systems, 31, vol. Issue 4, Dec. 2006, 35 Pages.
Joshi, et al., "Materialized Sample Views for Database Approximation", In Proceedings of the IEEE Transactions on Knowledge and Data Engineering, vol. 20, Issue 3, Mar. 2008, 15 Pages.
Kampstra, Peter, "Beanplot: A Boxplot Alternative for Visual Comparison of Distributions", In Journal of Statistical Software, Code Snippets, vol. 28, Issue 1, Nov. 2008, 9 Pages.
Khurana, et al., "A Framework for Fast Approximate Query Processing on Temporal Data", In Proceedings of the International Workshop on Big Data, Streams and Heterogeneous Source Mining, Aug. 24, 2014, pp. 29-45.
Kim, et al., "Rapid Sampling for Visualizations with Ordering Guarantees", In Proceedings of the VLDB Endowment, vol. 8, Issue 5, Aug. 31, 2015, pp. 521-532.
Kim, et al., "Selecting the Best System: Theory and Methods", In Proceedings of the 35th Conference on Winter Simulation, vol. 1, 2003, pp. 101-112.
Kleiner, et al., "A general Bootstrap Performance Diagnostic", In Proceedings of the 19th ACM SIGKDD International Conference on Knowledge Discovery and Data Mining, Aug. 11, 2013, 9 Pages.
Koh, et al., "ManiWordle: Providing Flexible Control Over Wordle", In Proceedings of the IEEE Transactions on Visualization and Computer Graphics, vol. 16, Issue 6, Nov. 2010, 8 Pages.
Kosara, et al., "Semantic Depth of Field", In Proceedings of the IEEE Symposium on Information Visualization, 2001, 8 Pages.
Koudas, et al., "Approximate NN Queries on Streams With Guaranteed Error/Performance Bounds", In Proceedings of Thirtieth International Conference on Very Large Data Bases, vol. 30, Aug. 31, 2004, pp. 804-815.
Kramer, et al., "A Temporal Foundation for Continuous Queries over Data Streams", Retrieved From: <<http://dbs.mathematik.uni-marburg.de/publications/myPapers/2005/KS05COMAD.pdf>>, Jan. 6, 2005, pp. 70-82.
Kwon, et al., "Skewtune: Mitigating Skew in MapReduce Applications", In Proceedings of the ACM SIGMOD International Conference on Management of Data, May 20, 2012, 12 Pages.
Laptev, et al., "Early Accurate Results for Advanced Analytics on MapReduce", In Proceedings of the VLDB Endowment, vol. 5, Issue 10, Aug. 27, 2012, 12 Pages.
Liu, "Approximate Query Processing", In Publication of Springer, Nov. 21, 2009, 9 Pages.
Li, et al., "A Platform for Scalable One-Pass Analytics Using MapReduce", In Proceedings of the ACM SIGMOD International Conference on Management of Data, Jun. 12-16, 2011, 12 Pages.
Loboz, et al., "DataGarage: Warehousing Massive Performance Data on Commodity Servers", In Proceedings of the VLDB Endowment, vol. 3, Issue 2, 2010, 12 Pages.
Logothetis, et al., "Stateful Bulk Processing for Incremental Analytics", In Proceedings of the 1st ACM Symposium Cloud Computing, Jun. 10, 2010, 12 Pages.
Luo, et al., "A Scalable Hash Ripple Join Algorithm", In Proceedings of the ACM SIGMOD International Conference on Management of Data, Jun. 4-6, 2002, 11 Pages.
Luo, et al., "Query Merging for Data Processing in the Cloud", Retrieved From: http://www.cs.duke.edu/-fanyang/file/296_final_report.pdf, Retrieved Date: Feb. 20, 2013, 5 Pages.
Maron, et al., "Hoeffding Races: Accelerating Model Selection Search for Classification and Function Approximation", In Proceedings of the Advances in Neural Information Processing Systems, 1994, 8 Pages.
Maurer, et al., "Empirical Bernstein Bounds and Sample Variance Penalization", In Proceedings of the Twenty Second Annual Conference on Learning Theory, 2009, 9 Pages.
McKay, et al., "Comparison of Three Methods for Selecting Values of Input Variables in the Analysis of Output from a Computer Code", In Proceedings of the Technometrics, vol. 21, Issue 2, May 1979, pp. 239-245.
Meijer, Erik, "The World According to LINQ", In Proceedings of the Communications of the ACM, vol. 54, Issue 10, Aug. 1, 2011, 13 Pages.
Melnik, et al., "Dremel: Interactive Analysis of Web-Scale Datasets", In Proceedings of the VLDB Endowment, vol. 3, Issue 1, Sep. 13, 2010, 10 Pages.
Michael, et al., "Simple, Fast, and Practical Non-Blocking and Blocking Concurrent Queue Algorithms", In Proceedings of the 15th Annual ACM Symposium on Principles of Distributed Computing, May 23, 1996, 9 Pages.
Moritz, D, et al., "Trust, but Verify: Optimistic Visualizations of Approximate Queries for Exploring Big Data", In Proceedings of the 2017 CHI Conference on Human Factors in Computing Systems, May 2, 2017, 12 Pages.
Neumeyer, et al., "S4: Distributed Stream Computing Platform", In Proceedings of the IEEE International Conference on Data Mining Workshops, Dec. 13, 2010, 8 Pages.
Olken, et al., "Random Sampling from Database Files: A Survey", In Proceedings of the 5th International Conference on Statistical and Scientific Database Management, 1990, pp. 92-111.
Olston, et al., "Interactive Analysis of Web-Scale Data", In Proceedings of 4th Biennial Conference on Innovative Data Systems Research, Jan. 4, 2009, 7 pages.

(56) References Cited

OTHER PUBLICATIONS

Olston, et al., "Pig Latin: A Not-So-Foreign Language for Data Processing", In Proceedings of the ACM SIGMOD International Conference on Management of Data, Jun. 9, 2008, pp. 1099-1110.
Pansare, et al., "Online Aggregation for Large MapReduce Jobs", In Journal of VLDB Endowment, vol. 4, Issue 11, Aug. 29, 2011, pp. 1135-1145.
"International Preliminary Report on Patentability Issued in PCT Application No. PCT/US2013/049820", dated Feb. 19, 2015, 11 Pages.
"International Search Report and Written Opinion Issued in PCT Application No. PCT/US2013/049820", dated May 26, 2014, 13 Pages.
"PCT Demand under Article 34 Issued in PCT Application No. PCT/US2013/049820", Filed Date: Aug. 26, 2014, 18 Pages.
"Second Written Opinion Issued in PCT Application No. PCT/US2013/049820", dated Sep. 24, 2014, 10 Pages.
"International Preliminary Report on Patentability Issued in PCT Patent Application No. PCT/US2014/041450", dated Aug. 12, 2015, 10 Pages.
"International Search Report and Written Opinion Issued in PCT Application No. PCT/US2014/041450", dated Nov. 25, 2014, 14 Pages.
"PCT Demand and Article 34 Issued in PCT Application No. PCT/US2014/041450", Filed Date: Mar. 11, 2015, 18 Pages.
"Second Written Opinion Issued in PCT Patent Application No. PCT/US2014/041450", dated Apr. 22, 2015, 9 Pages.
"International Search Report and Written Opinion Issued in PCT Application No. PCT/US2017/038407", dated Aug. 31, 2017, 15 Pages.
Pike, et al., "Interpreting the Data: Parallel Analysis with Sawzall", In Scientific Programming—Dynamic Grids and Worldwide Computing, vol. 13, Issue 4, Oct. 1, 2005, pp. 277-298.
Piringer, et al., "A Multi-Threading Architecture to Support Interactive Visual Exploration", In Proceedings of the IEEE Transactions on Visualization and Computer Graphics, vol. 15, Issue 6, Oct. 23, 2009, pp. 1113-1120.
Potti, et al., "DAQ: A New Paradigm for Approximate Query Processing", In Proceedings of the VLDB Endowment, vol. 8, Issue 9, Aug. 31, 2015, pp. 898-909.
Raman, et al., "Online Dynamic Reordering for Interactive Data Processing", In Proceedings of the 25th International Conference on Very Large Data Bases, vol. 99, Sep. 7, 1999, 19 Pages.
Zhou, et al., "Incorporating Partitioning and Parallel Plans into the Scope Optimizer", In Proceedings of the IEEE 26th International Conference on Data Engineering, Mar. 1, 2010, 12 Pages.
Robertson, et al., "Effectiveness of Animation in Trend Visualization", In Proceedings of the IEEE Transactions on Visualization and Computer Graphics, vol. 14, Issue 6, Nov. 2008, 8 Pages.
Rowstron, et al., "Nobody Ever Got Fired for Using Hadoop on a Cluster", In Proceedings of the 1st International Workshop on Hot Topics in Cloud Data Processing, Apr. 10, 2012, 5 Pages.
Rusu, et al., "Statistical Analysis of Sketch Estimators", In Proceedings of the ACM SIGMOD International Conference on Management of Data, Jun. 11, 2007, 12 Pages.
Ryvkina, et al., "Revision Processing in a Stream Processing Engine: A High-Level Design", In Proceedings of the 22nd International Conference on Data Engineering, Apr. 3, 2006, 3 Pages.
Salton, et al., "Term-Weighting Approaches in Automatic Text Retrieval", In Proceedings of the Information Processing & Management, vol. 24, Issue 5, Aug. 1, 1988, pp. 513-523.
Sanyal, et al., "A User Study to Compare Four Uncertainty Visualization Methods for 1D and 2D Datasets", In Proceedings of the IEEE Transactions on Visualization and Computer Graphics, vol. 15, Issue 6, Nov. 2009, pp. 1209-1218.
Sato, Kazunori, "An Inside Look at Google BigQuery", Retrieved From: https://cloud.google.com/files/BigQueryTechnicalWP.pdf, Retrieved Date: Feb. 20, 2013, 12 Pages.

Seow, Steven C., "Designing and Engineering Time: the Psychology of Timer Perception in Software", In Addison-Wesley Professional, 2008, 251 Pages.
Shneiderman, Ben, "Extreme Visualization: Squeezing a Billion Records into a Million Pixels", In Proceedings of the ACM SIGMOD International Conference on Management of Data, Jun. 9, 2008, 10 Pages.
Shneiderman, et al., "Response Time and Display Rate in Human Performance with Computers", In Journal of ACM Computing Surveys, vol. 16, Issue 3, Sep. 1984, pp. 265-285.
Sidirourgos, et al., "Sciborq: Scientific Data Management with Bounds on Runtime and Quality", In Proceedings of 5th Biennial Conference on Innovative Data Systems Research, Jan. 9, 2011, pp. 296-301.
Simonson, et al., "A DBMS for the US Bureau of the Census", In Proceedings of the ACM 1st International Conference on Very Large Data Bases, 1975, 3 Pages.
Skeels, et al., "Revealing Uncertainty for Information Visualization", In Proceedings of the ACM Working Conference on Advanced Visual Interfaces, May 28, 2008, 4 Pages.
Slezak, et al., "Towards Approximate SQL: Infobright's Approach", In Proceedings of the 7th International Conference on Rough Sets and Current Trends in Computing, 2010, pp. 630-639.
Smith, et al., "FacetMap: A Scalable Search and Browse Visualization", In Proceedings of the IEEE Transactions on Visualization and Computer Graphics, vol. 12, Issue 5, Nov. 20, 2006, 8 Pages.
Srivastava, et al., "Flexible Time Management in Data Stream Systems", In Proceedings of the Twenty-Third ACM SIGMOD-SIGACT-SIGART Symposium on Principles of Database Systems, Jun. 14, 2004, 11 Pages.
Stonebraker, et al., "C-store: A Column-Oriented DBMS", In Proceedings of the 31st International Conference on Very Large Data Bases, Aug. 30, 2005, 12 Pages.
Streit, et al., "A Spreadsheet Approach to Facilitate Visualization of Uncertainty in Information", In Proceedings of the IEEE Transactions on Visualization and Computer Graphics, vol. 14, Issue 1, Jan. 2008, pp. 61-72.
Thomson, et al., "A Typology for Visualizing Uncertainty", In Proceedings of the SPIE C& IS&T Conference on Electronic Imaging, Visualization and Data Analysis, vol. 5569, Jan. 16, 2005, 12 Pages.
Tucker, et al., "Exploiting Punctuation Semantics in Continuous Data Streams", In Proceedings of the IEEE Transactions on Knowledge and Data Engineering, vol. 15, Issue 3, May 13, 2003, pp. 555-568.
Upadhyaya, et al., "A Latency and Fault-Tolerance Optimizer for Online Parallel Query Plans", In Proceedings of the ACM SIGMOD International Conference on Management of Data, Jun. 12, 2011, 12 Pages.
Viegas, et al., "Participatory Visualization with Wordle", In Proceedings of the IEEE Transactions on Visualization and Computer Graphics, vol. 15, Issue 6, Nov. 2009, 8 Pages.
Viglas, et al., "Rate-Based Query Optimization for Streaming Information Sources", In Proceedings of the ACM SIGMOD International Conference on Management of Data, Jun. 3, 2002, 13 Pages.
Vitter, et al., "Approximate Computation of Multidimensional Aggregates of Sparse Data Using Wavelets", In Proceedings of ACM SIGMOD International Conference on Management of Data, Jun. 1, 1999, pp. 193-204.
Wang, et al., "A Sample-and-Clean Framework for Fast and Accurate Query Processing on Dirty Data", In Proceedings of the ACM SIGMOD International Conference on Management of Data, Jun. 22, 2014, pp. 469-480.
White, Tom, "Hadoop: The Definitive Guide", In Proceedings of the O'Reilly Media / Yahoo Press, May 7, 2012, 525 Pages.
Wittenbrink, et al., "Glyphs for Visualizing Uncertainty in Vector Fields", In Proceedings of the IEEE Transactions on Visualization and Computer Graphics, vol. 2, Issue 3, Sep. 1996, 14 Pages.
Yan, et al., "How much can Behavioral Targeting Help Online Advertising?", In Proceedings of the 18th International Conference on World Wide Web, Apr. 20-24, 2009, 10 Pages.

(56) References Cited

OTHER PUBLICATIONS

Yarygina, et al., "Optimizing Resource Allocation for Approximate Real-Time Query Processing", In Proceedings of Computer Science and Information Systems, vol. 11, Issue 1, Jan. 2014, pp. 69-88.
Yu, et al., "DryadLINQ: A System for General-Purpose Distributed Data-Parallel Computing Using a High-Level Language", In Proceedings of the 8th USENIX Conference on Operating Systems Design and Implementation, vol. 8, Dec. 8, 2008, 14 Pages.
Zaharia, et al., "Discretized Streams: An Efficient and Fault-Tolerant Model for Stream Processing on Large Clusters", In Proceedings of the HotCloud, vol. 12, 2012, 6 Pages.
Zaharia, et al., "Resilient Distributed Datasets: A Fault-Tolerant Abstraction for In-Memory Cluster Computing", In Proceedings of the 9th USENIX Conference on Networked Systems Design and Implementation, Apr. 25, 2012, 14 Pages.
Zeng, et al., "The Analytical Bootstrap: A New Method for Fast Error Estimation in Approximate Query Processing", In Proceedings of ACM SIGMOD International Conference on Management of Data, Jun. 22, 2014, pp. 277-288.
Rijsbergen, Van, et al., "New models in Probabilistic Information Retrieval", London: British Library Research and Development Department, 1980, pp. 1-123.
"Non Final Office Action Issued in U.S. Appl. No. 15/192,909", dated Aug. 24, 2018, 28 Pages.
"Final Office Action Issued in U.S. Appl. No. 15/192,909", dated Apr. 12, 2019, 27 Pages.
"Non Final Office Action Issued in U.S Appl. No. 15/192,909", dated Sep. 30, 2019, 28 Pages.

* cited by examiner

FAST APPROXIMATE RESULTS AND SLOW PRECISE RESULTS

TECHNICAL FIELD

The subject matter disclosed herein generally relates to computer-based data visualization systems and tools for use in exploratory data analysis (EDA), and more specifically, to computer program products, methods and systems that facilitate advantageous data visualization techniques for use with data visualization systems and tools that use what are commonly referred to as, Approximate Query Processing (AQP) techniques.

BACKGROUND

Exploratory data analysis (EDA) is a process of examining multidimensional datasets by looking at the distributions and correlations of fields. Using computer-based data visualization systems and tools, a data analyst might quickly generate and analyze dozens or hundreds of data visualizations (e.g., charts and graphs) as he seeks to understand the data. The process of moving through the multiple dimensions of data is typically iterative. A data analyst may begin with a broad question, and create multiple views (i.e., visualizations of the dataset) that address some part of the question. These views can inform a more-specific question, and so the data analyst might create another view to address that more specific question. These increasingly-specific questions may require the data analyst to change data representations, for instance, to filter the data by zooming or filtering views, and to choose new fields to chart, graph and/or explore. Some of the views that a data analyst generates will contain or lead to interesting insights. However, others may lead to dead ends with less value. When the data analyst has sufficiently addressed the broad question and any follow-up questions, he may continue exploring the dataset with a new broad question and a related series of specific follow-up questions.

Data visualization systems and tools—whether implemented with point-and-click or programmatic user interfaces—support this data exploration process by allowing data analysts to rapidly specify and refine queries, and then view their corresponding data visualizations. Each step in this process involves generating observations of the data. In the context of EDA, an observation is a single fact about the data; it is the unit of knowledge that allows the data analyst to move on to the next step of their analysis. For example, when examining a dataset of flight data, an observation might be, "Airline X is the airline with the most flights in the dataset." It is a more modest unit than the insights that the data analyst might ultimately hope to infer as the outcome of his analysis process. For instance, an insight might bring in external contextual information and multiple observations that have resulted from many queries. An example of an insight might be, "the biggest airlines have trouble with congestion near the holidays, while smaller airlines do not."

For this process of generating observations that lead to interesting insights to be effective, the data visualization system or tool in use by the data analyst must be fast enough to enable rapid iteration. Studies have shown that data analysts lose effectiveness when a query result takes more than five hundred milliseconds to return, and when a computer operation takes more than a second to complete, data analysts are more likely to lose their flow of thought. As such, effective data visualization systems or tools will allow the data analyst to work in what is sometimes referred to as interactive time. While no formal definition is recognized, the concept of interactive time simply means that the system provides a level of query responsiveness that allows the data analyst to maintain his concentration and flow of thought.

With smaller datasets, this requirement for data visualization systems and tools to be responsive—that is, rapidly processing queries and generating data visualizations—may not provide any technical challenges. However, with the increasing desire and need to analyze and explore extremely large datasets with millions or multiple millions of records, designing a data visualization system or tool that provides the requisite level of responsiveness becomes a technically challenging problem. Specifically, when dataset sizes exceed even a few million records, data analysts run into two fundamental issues: visual scalability and data processing scalability.

In terms of visual scalability, with extremely large datasets, it is impractical to display every element of the dataset. For instance, the number of records returned from a query may far exceed the available pixels on a high-resolution display. As an example, drawing raw data in a scatterplot without aggregation may lead to over-plotting—drawing many points in the same place—and visual clutter. The data can be grouped on a dimension, however, and a single aggregate measure computed for each group. The simplest such aggregate visualization is a bar chart, in which each bar represents the aggregated value of a group. Other data visualizations involving the aggregation of data are also well known, and to a certain extent, provide a partial solution to the problem of visual scalability.

The other fundamental issue that arises when working with extremely large datasets is data processing scalability—specifically, the time it takes to execute a query against an extremely large dataset often exceeds that which allows a data analyst to be efficient and successful in exploring data and deriving observations. Developers of data visualization systems and tools have approached the issue of query responsiveness in a few different ways. One approach involves precomputing and storing partially-aggregated data results, such that, at query time, the data visualization system can retrieve and assemble these partial answers quickly. However, this approach requires that the appropriate fields be selected for aggregation and optimization, which means far more time and energy are expended in the planning stage, and when the proper fields are not selected, the overall flexibility in how a data analyst goes about querying the data may be significantly reduced.

A second approach involves distributed computing. Specifically, certain data visualization systems and tools distribute a query across many network-connected computers, which process a query against some subset of the large dataset. The final query result is then assembled from the partial results. However, in this type of distributed system, network latencies are introduced, and these network latencies can often last into the seconds.

A third approach is generally referred to as Approximate Query Processing (AQP). AQP involves generating approximate data visualizations, as opposed to precise data visualizations, that are based on a representative subset (e.g., sample) of the dataset. AQP techniques trade accuracy or precision for speed or query responsiveness. As a simple example, with an AQP approach, the sum of a set of values might be approximated by computing the sum of ten percent of the values and then estimating the true sum to be ten times the aggregate value of the sample. This value is an estimate, and carries some uncertainty, which can be expressed as error bounds. Those bounds widen with the variance of the data, and narrow with the square root of the size of the sample.

Some AQP-based data visualization systems or tools create a sample of the data before the data analyst begins her analysis. In other systems, the sampling process might be integrated directly into the database management system. In general, a variety of different sampling and estimation techniques are known to work with AQP-based data visualizations systems. These systems pick a sample and compute a result along with estimated error bounds. With some systems, the analyst may choose either a maximum amount of time that a query can execute, or desired error bounds. To ensure query responsiveness, AQP-based data visualization systems tend to use time bounds to get a best-effort approximation within that time bound.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
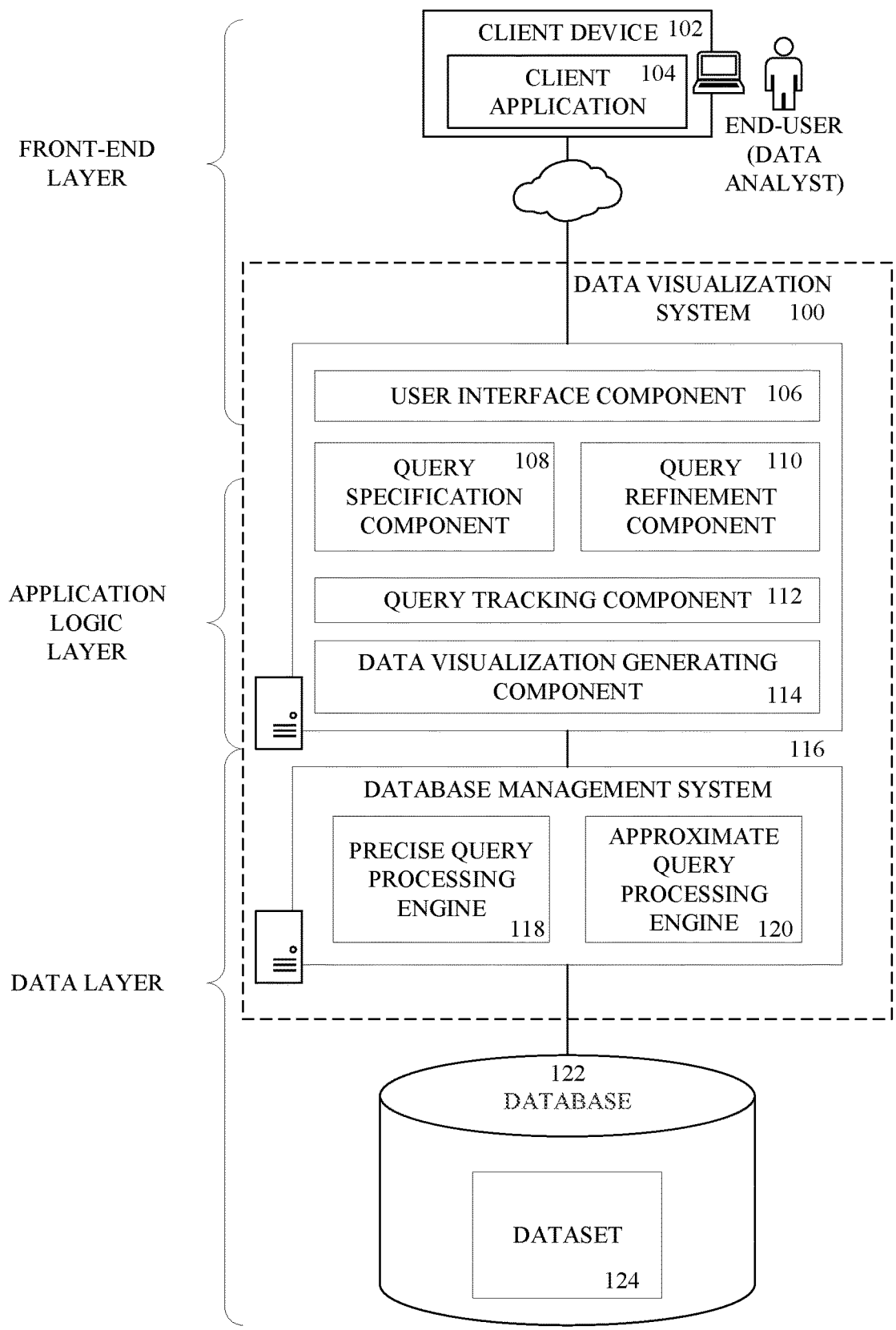
FIG. 1 is a block diagram illustrating various functional components of a data visualization system for facilitating data visualization techniques, consistent with embodiments of the present invention.

Described herein are methods, systems and computer program products to facilitate the presentation of fast approximate query results, while providing for the presentation of slow precise query results, for select queries. In the following description, for purposes of explanation, numerous specific details are set forth in order to provide a thorough understanding of the various aspects of different embodiments of the present invention. It will be evident, however, to one skilled in the art, that the present invention may be practiced without all of these specific details.

Data visualization systems that implement approximate query processing (AQP) techniques provide query responsiveness, at the expense of precision. For instance, by processing a query against some representative subset of a dataset, approximate query results can be obtained quickly, and a visualization of the data can be presented in what is referred to as interactive time. While the benefit of AQP-based systems is query responsiveness, the downside is that the data visualization is not precise, which might lead a data analyst to make an erroneous data observation. Accordingly, one of the primary problems with data visualization systems and tools that implement AQP techniques is trust. Data analysts may lose trust in their data observations, and ultimately their insights, derived from the approximate visualizations being presented.

Consistent with some embodiments of the present invention, data analysts' trust in an AQP-based data visualization system is restored by enabling the data analysts to selectively refine into precise query results only those queries for which the data analyst believes a precise result is necessary to verify or confirm a data observation derived from an approximate data visualization based on an approximate query result—that is, the data returned from a query executed against some representative subset of the dataset. When a data analyst is presented with an approximate visualization, the data analyst is provided an opportunity to record his data observation (e.g., by entering text in a text entry box), and simultaneously request a precise visualization for the subject query. The query is then executed, in the background, against the entire dataset to ultimately derive a precise query result and associated precise data visualization. As the query is being executed in the background, the data analyst is free to specify and execute additional queries in interactive time. These additional query requests will be processed to generate approximate query results and corresponding approximate visualizations. When the query processing has completed for the request to generate the precise query result, the precise data visualization for that query will be presented, along with the initial data observation that the data analyst recorded when viewing the approximate visualization. As such, the data analyst can confirm or disprove his original observation made when viewing the approximate visualization for the query. Other aspects of the present inventive subject matter are described below in connection with the description of the various figures.

For purposes of the present disclosure, a "query result" represents the raw data or information returned from executing a query against a dataset. Similarly, an "approximate query result" is the raw data returned from executing a query against some subset (e.g., sample) of a dataset, while a "precise query result" is the raw data returned when a query is processed against an entire dataset. A "visualization" or "data visualization" is a visual representation of data returned from a query. As such, an "approximate visualization" is a visual representation of data or information obtained from an approximate query result, while a "precise visualization" is a visual representation of data or information obtained from a precise query result. A wide variety of specific data visualizations are consistent with various embodiments of the present invention, and such visualizations include, but are not limited to: bar charts, histograms, scatter plots, network diagrams, streamgraphs, pie charts, and heatmaps.

FIG. 1 is a block diagram illustrating components of a data visualization system (100) for facilitating data visualization techniques, consistent with embodiments of the present invention. As shown in FIG. 1, the data visualization system (100) is generally based on a client-server, three-tiered architecture, consisting of a front-end layer, application logic layer, and data layer. As is understood by skilled artisans in the relevant computer and Internet-related arts, each component or engine shown in FIG. 1 represents a set of executable software instructions and the corresponding hardware (e.g., memory and processing unit) for executing the instructions. To avoid obscuring the inventive subject matter with unnecessary detail, various functional components and engines that are not germane to conveying an understanding of the inventive subject matter have been omitted from FIG. 1. However, a skilled artisan will readily recognize that various additional functional components and engines may be used with a data visualization system, such as that illustrated in FIG. 1, to facilitate additional functionality that is not specifically described herein. Furthermore, the various functional components and engines depicted in FIG. 1 may reside on a single server computer, or may be distributed across several network-connected server computers in various arrangements. Moreover, although depicted in FIG. 1 as a three-tiered architecture, the inventive subject matter is by no means limited to such architecture.

As shown in FIG. 1, the front-end layer consists of a client device (102), on which resides and executes a client application (104). This client application (104) may be a conventional web browser application, or a native application that has been developed for a specific platform to include any of a wide variety of computing devices, including mobile devices, and operating systems. The client application (104) provides the primary user interface to the end-user (e.g., data analyst), who interacts with the user interface to invoke requests directed to the application logic layer, for example, by specifying queries, and to view various data visualizations that result from processing queries. Additionally, the front-end layer includes a user interface component (e.g., an application or web server) (106), which receives requests over a communications network from various client-computing devices, and communicates appropriate responses to the requesting client devices. For example, the user interface component (106) may receive requests in the form of Hypertext Transport Protocol (HTTP) requests, or other web-based, application programming interface (API) requests.

The user interface component (106) operates in connection with various components of the application logic layer to provide different user interfaces that enable the data analyst to specify and execute queries. For instance, the query specification component (108) operates in connection with the user interface component (106) to present the data analyst with an interface that allows the data analyst to select a particular dataset that is to be analyzed, specify various parameters of a query (e.g., the type of data visualization to be generated, the data fields to be included in the visualization, and other parameters specific to the selected type of data visualization), and then execute the query. The query refinement component (110) provides the data analyst with an interface via which the data analyst can request modification of the representation of a data visualization, for instance, by filtering data records returned by a query, and/or modifying other query parameters.

Consistent with some embodiments of the present invention, the query tracking component (112) tracks the status of queries, which can then be conveyed via the user interface at the client device. For example, after viewing an approximate visualization for a query, a data analyst might request a precise visualization in order to confirm or verify a data observation inferred from the approximate visualization. Upon receiving the request to generate the precise visualization, the query tracking component (112) stores the request including the query parameters, monitors the status of the resulting query processing that occurs to generate the precise visualization, and in some instances, provides status updates on the query processing. For example, the query tracking component (112) may generate and provide information indicating how long, in terms of time, a precise query has been executing, or how long until the query is expected to be completed. Similarly, the query tracking component (112) may generate or otherwise obtain information about the percentage of the dataset against which the query has been executed, and provide such information for presentation at the client application.

The data visualization generating component (114) derives data visualizations based on query results. For instance, when the approximate query processing engine (120) of the database management system (116) completes execution of an approximate query, the data visualization generating component (114) will generate a data visualization from the approximate query results, and based on the query parameters (e.g., the chart type, and any associated parameters specific to that chart type). This data visualization is then communicated via the user interface component (106) to the client application (104) for presentation to the data analyst. With some embodiments, the data visualization generating component (114) derives visualizations that combine a precise visualization and approximate visualization, for the same query, into one visualization. For instance, the approximate visualization, or some portion thereof, may be superimposed over the precise visualization, and presented in different color(s), to allow the data analyst to quickly compare the two results.

As shown in FIG. 1, the data layer includes a precise query processing engine (118), an approximate query processing engine (120), and a database (122) storing one or more datasets (124). As their names suggest, the precise query processing engine (118) processes queries against an entire dataset, to generate precise query results, while the approximate query processing engine (120) generates an approximate query result by processing a query against a representative subset of the dataset. Consistent with some embodiments, the precise query processing engine (118) may be, or may otherwise be integrated to use, any of a wide variety of conventional database systems, such as the SQL Server® database system, as developed by Microsoft® of Redmond, Wash.

Consistent with embodiments of the invention, the approximate query processing engine (120) obtains approximate query results for a particular query, by executing the query against a sample of the dataset specified by the query. Skilled artisans will recognize that the inventive subject matter described herein is not dependent upon any one particular AQP technique, but might be implemented with any of a number of known AQP techniques. With some embodiments, the samples of the dataset against which the approximate queries are executed are created in advance of the analysis performed by the data analyst. In other embodiments, the sampling of the data occurs at query processing time.

In general, query responsiveness is guaranteed by the approximate query processing engine (120) by using either an error bound technique, time bound technique, or some combination. Using a time bound technique, the approximate query processing engine (120) creates a sample of the dataset by loading and processing records from the dataset for some predetermined maximum query processing time. While this technique guarantees query responsiveness, no guarantees can be made about the measure of uncertainty. However, in those instances where the measure of uncertainty causes concern for the data analyst, the data analyst can simply request that a precise result be generated. Using an error bound technique, the approximate query processing engine (120) incrementally loads and processes records of a dataset into a sample until some uncertainty bound—that is, a measure for the magnitude of possible error in the approximate query result, compared to the precise query result—is reached. As such, the sample size is algorithmically determined to ensure that this measure for the magnitude of possible error in the approximate query result, compared to the precise query result, does not exceed a predetermined error threshold. To ensure query responsiveness using an error bound technique, the query processing may be terminated at some maximum query processing time, before the error bound condition is satisfied.

Figure 2:
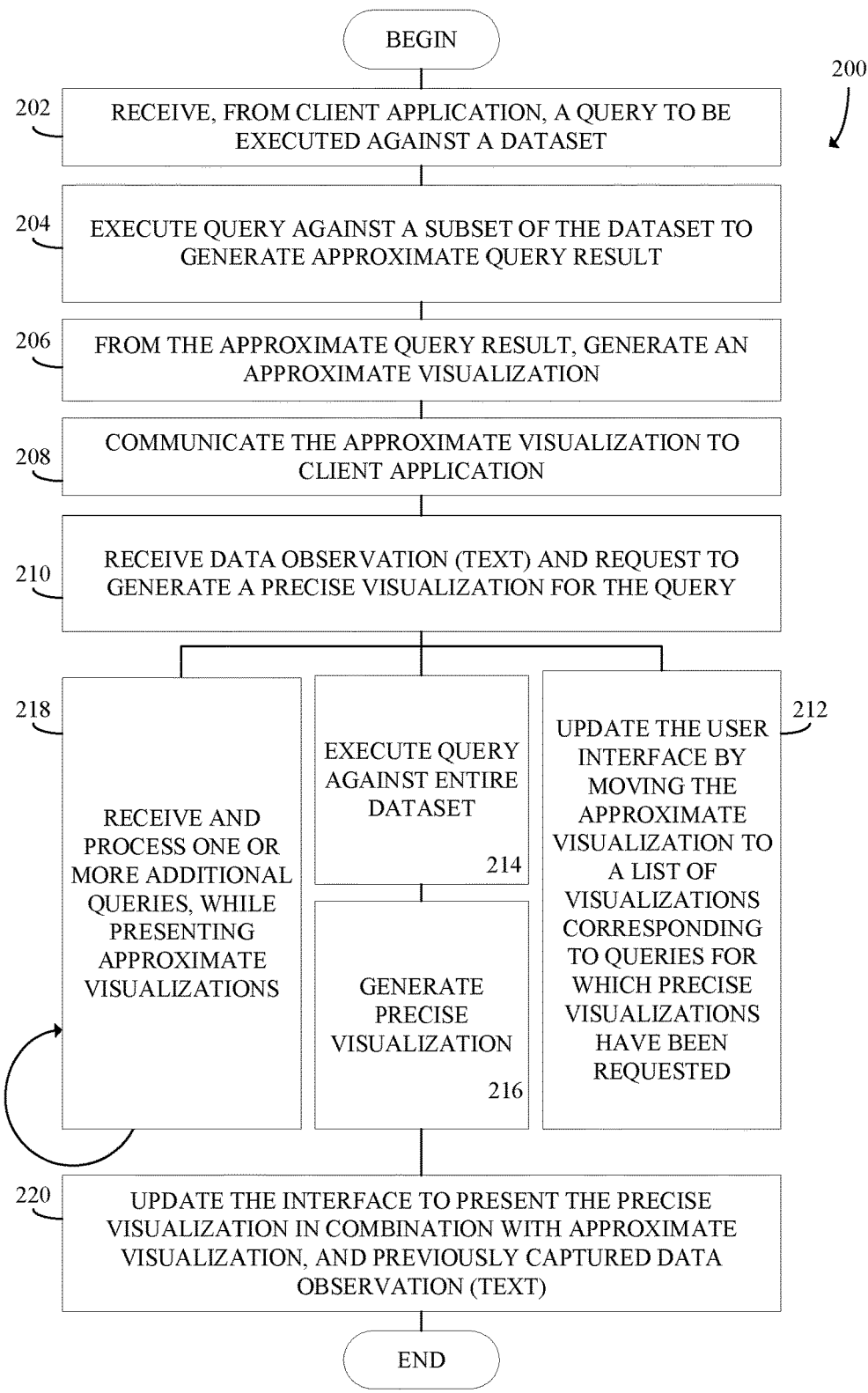
FIG. 2 is a flow diagram illustrating various operations of a method or algorithm performed by a data visualization system, consistent with embodiments of the present invention, when generating fast approximate results, and slow precise results.

FIG. 2 is a flow diagram illustrating various operations of a method 200 or algorithm performed by a data visualization system, consistent with embodiments of the present invention, when generating fast approximate results, and slow precise results. As illustrated in FIG. 2 at reference number 202, a data visualization system receives, from a client application executing on a client device, a query to be executed against a dataset. At the method operation with reference number 204, the data visualization system processes the query, for example, with an approximate query processing engine, against some representative subset of the dataset to generate an approximate query result. Next, with reference to the operation number 206, the data visualization system generates an approximate visualization from the approximate query result. At method operation 208, the data visualization system communicates the approximate visualization to the client device from which the query was received, so that the client device can present or display the approximate visualization to the data analyst. Note, in this example, the presentation of the approximate visualization is performed at and by the client application, but the data visualization system causes this presentation to occur, for example, by communicating the approximate visualization to the client application.

Upon viewing the approximate visualization, the data analyst may make an observation about the data. To verify (or disprove) his observation, the data analyst may first record his observation, for example, by entering a textual description of his observation in a text entry box that has been presented with the approximate visualization. Next, the data analyst may select a button, or other graphical user interface element, to indicate the data analyst's desire to view a precise visualization for the query. Accordingly, as a result of the client application detecting that the data analyst has requested a precise visualization (e.g., by selecting a graphical user interface element, such as a button), at method operation 210, the data visualization system receives, from the client application executing at the client device, a request to generate a precise visualization for the query, along with text representing an observation made by the data analyst about the data, as represented by the approximate visualization.

Upon receiving such a request for a precise visualization, the data visualization system performs several operations in response. First, as illustrated by the method operation with reference number 212, the data visualization system communicates information to the client application that causes an update of the user interface. Specifically, the information communicated to the client application causes the approximate visualization to be repositioned within the user interface from a first portion of the interface, to a second portion, which includes a group or list of visualizations corresponding with queries for which the data analyst has requested precise visualizations. As presented in this list, the approximate visualization is formatted and labeled to indicate that it is an approximate visualization, for which a precise visualization is being generated. For example, the approximate visualization may be labeled as such, and/or may be presented in a particular color, or group of colors (e.g., color theme), to indicate its status as an approximate visualization.

In some instances, the status of the query processing that is occurring in the background for the precise visualization may be presented, for example, by presenting the time until completion of the query processing, or the percentage of data in the dataset against which the query has been executed.

In addition, upon receiving the request to generate a precise visualization (e.g., at method operation 210), the data visualization system begins executing the query against the entire dataset, as illustrated at the method operation with reference number 214. When query execution has completed against the dataset, the data visualization system generates a corresponding precise visualization for the query (216).

While the query is being executed against the dataset, the data analyst is free to continue his work by initiating additional queries, for which the data visualization system will respond with approximate visualizations in interactive time. As illustrated in FIG. 2 with reference number 218, the data visualization system may receive and process additional queries, while presenting approximate visualizations for each additional query.

Upon completion of the method operation with reference number 216, the data visualization system communicates the precise visualization to the client application for presentation to the data analyst. Specifically, the presentation of the approximate visualization that was previously repositioned is updated (e.g., replaced by) the precise visualization. In some instances, the data analyst's original observation is presented with the precise visualization, enabling the data analyst to recall his original observation and thereby confirm (or disprove) his original observation. Additionally, the precise visualization may be presented in a color or color scheme that indicates its status as a precise visualization, and may also be labeled to indicate that it is representative of the complete and precise result. Furthermore, in some instances, the precise visualization for the query may be presented with the previously generated approximate visualization, thereby allowing the data analyst to compare the two results. For example, the two visualization may be presented next to one another in a side-by-side, or, above-and-below, view. Alternatively, the approximate visualization, or some portion thereof, may be presented superimposed over the precise visualization.

Figure 3:
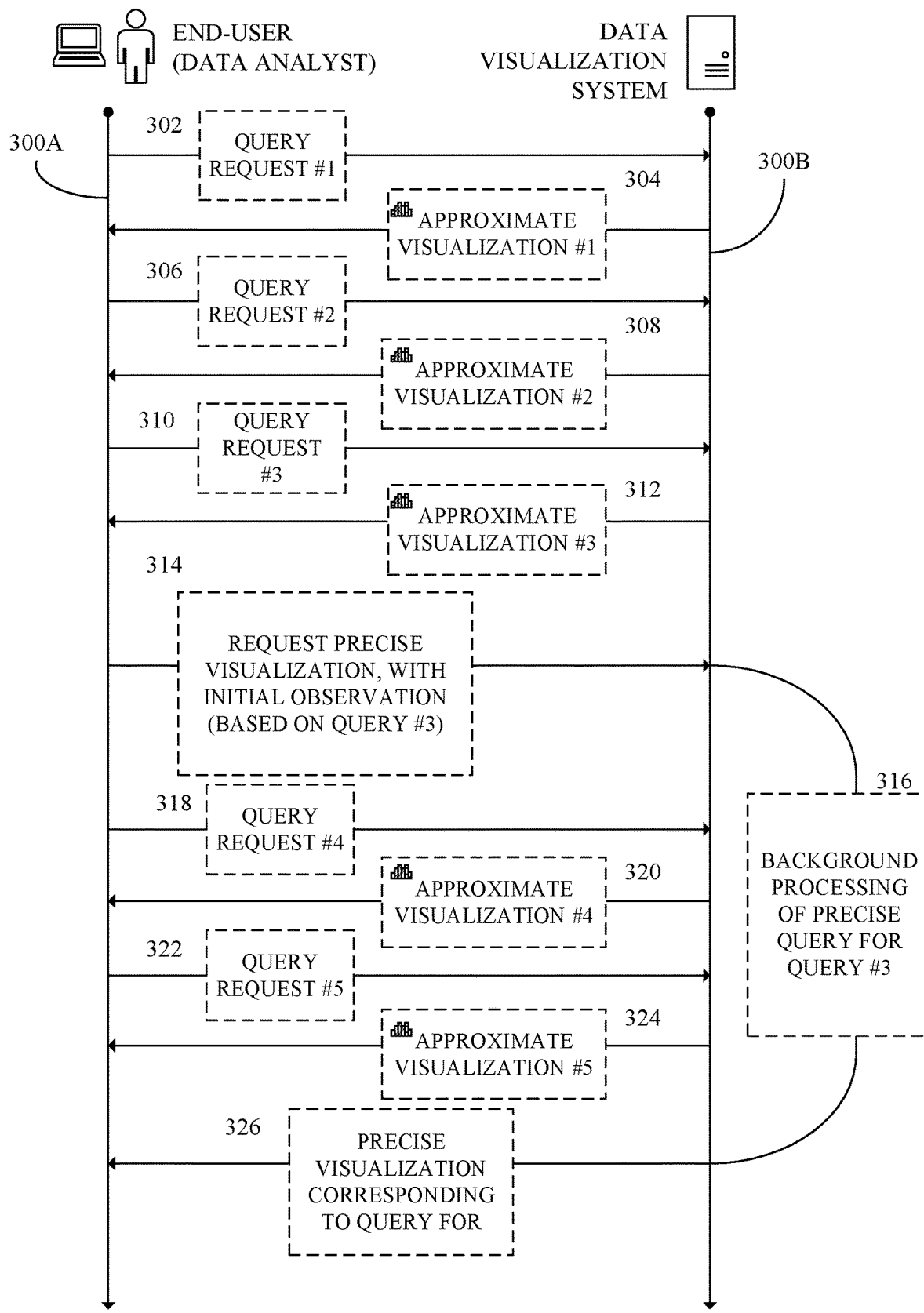
FIG. 3 is a flow diagram illustrating an example of the interaction that a data analyst might have with a data visualization system, such as that illustrated in FIG. 1 and consistent with embodiments of the present invention.

FIG. 3 is a flow diagram illustrating an example of the data flow that might occur between a client application and a data visualization system, as a data analyst interacts with a user interface (such as the example user interface illustrated in FIG. 4), consistent with some embodiments of the present invention. Advantageously, the data visualization system as described herein provides query responsiveness—that is, queries can be processed by the approximate query processing engine rapidly, allowing the data analyst to iteratively explore extremely large datasets in interactive time. For any particular query, the data analyst can make an observation based on the approximate result (e.g., the approximate visualization), and then confirm or verify his observation against the precise results (e.g., the precise visualization) at a later time, thereby allowing the data analyst to maintain his concentration and flow of thought.

As illustrated in FIG. 3, during a data analysis session, a data analyst may interact with a user interface 400 of the data visualization system to iteratively perform a series of steps to specify a query, execute the query, and then receive at the client device, for viewing, an approximate visualization for the query. In FIG. 3, the lines with reference numbers 300A and 300B represent timelines to convey the flow of data, over time, between a client application controlled or operated by a data analyst, and the data visualization system. As illustrated in FIG. 3, the data analyst specifies a first query to be executed against a dataset, and causes the first query request, with reference number 302, to be communicated to the data visualization system.

Figure 4:
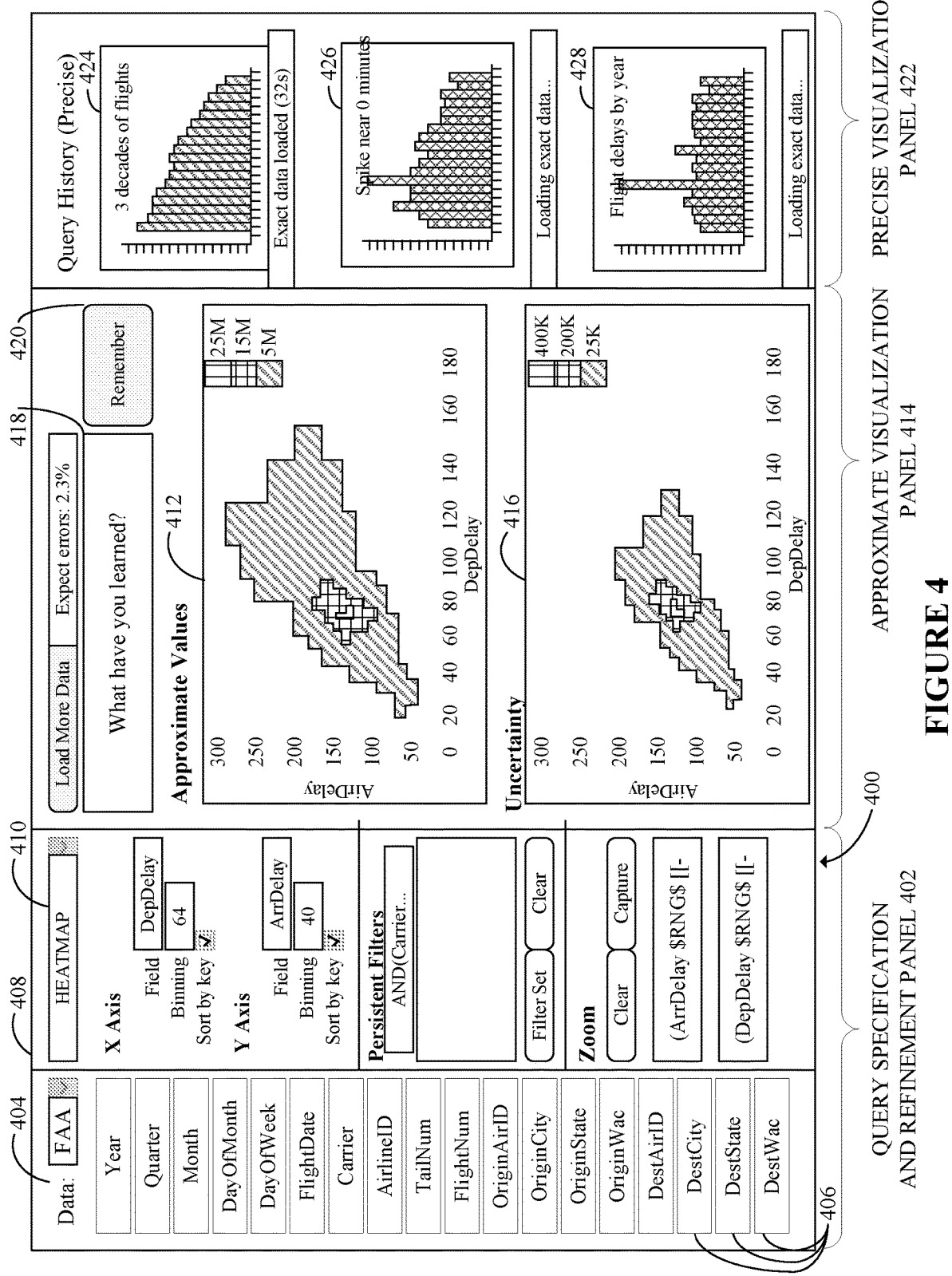
FIG. 4 is a user interface diagram illustrating a user interface for a data visualization system that facilitates visualization techniques, consistent with embodiments of the present invention.

In specifying the query, the data analyst interacts with a user interface, such as the query specification and refinement panel 402 of the example user interface 400 presented in FIG. 4. Referring to FIG. 4, at the top of the left most column in the user interface 400, the data analyst may select a dataset using a dropdown list 404. In this example, the data analyst has selected a dataset with the name "FAA". Based on the selected dataset, the left most column 406 of the query specification and refinement panel presents a searchable schema of fields for the selected dataset, where each field can be dropped (e.g., selected, or dragged-and-dropped) to the chart specification panel 408 of the query specification panel 402. In this chart specification panel 408, the data analyst specifies a data visualization type (e.g., HEATMAP, as selected in the dropdown list with reference number 410), along with the data fields for the selected chart type, and any other chart-specific parameters.

Referring again to FIG. 3, upon receiving the first query request (302), the data visualization system processes the query with an approximate query processing engine to obtain an approximate query result, generates from the approximate query results an approximate visualization, and communicates the approximate visualization (304) back to the client device. Referring briefly to the example user interface of FIG. 4, in this example, the resulting approximate visualization is a heatmap (412) that is shown within the approximate visualization panel 414, along with a separate visualization—in this instance, a second heatmap (416)—to illustrate the uncertainty associated with the approximate results.

The data analyst, upon viewing the approximate visualization (412) for the first query request, makes an observation from the approximate visualization, and then proceeds with his analysis. Specifically, and referring again to FIG. 3, as shown by reference number 306, the data analyst manipulates the user interface of the data visualization system to generate a second query request. The data visualization system processes this second query request, and returns to the client device an approximate visualization for this second request (308). This approximate visualization appears in the same position as the heatmap 412 that resulted from the first query request. This iterative process is repeated for a third query request (310), and again the data visualization system returns an approximate visualization for the third query request (312).

Referring again to FIG. 3, upon receiving and viewing the approximate visualization for the third query request, the data analyst makes an observation, enters a textual description of his observation into a text entry box, and then selects a button or similar graphical user interface element to generate a request for a precise visualization for his third query request. By way of example, the user interface of FIG. 4 illustrates a text entry box (418), with the label, "What have you learned?" and a corresponding button (420), with label, "Remember". By entering a textual description of a data observation, and selecting the "Remember" button (420), the data analyst can record his data observation for subsequent presentation with the precise visualization for the query. This will allow the data analyst to recall, at a later time, what insight or observation the data analyst made about the data, based on viewing the approximate visualization.

Referring again to FIG. 3, the data visualization system receives the request for the precise visualization (314), and begins executing the query in the background (316) against the entire dataset, for example, using a precise query engine. The approximate visualization for the third query request is then repositioned in the user interface. For example, the approximate visualization may be added to a list of visualizations for which the data analyst has requested precise query results. Accordingly, with some embodiments, the approximate visualization may be presented in this list along with information that conveys the status of the precise query processing, such as the expected completion time. Referring to FIG. 4, the precise visualization panel 422 illustrates a list of visualizations that correspond to queries, for which the data analyst has requested precise results. In this example, the visualization with reference number 424 represents a precise visualization—that is, the chart has been generated based on precise query results, executed against the entire dataset. Although not easily ascertained from FIG. 4 (due to lack of color), in some embodiments, the color of the chart with reference number 424, which represents a precise result, will differ from that of the charts with reference numbers 426 and 428, which represent approximate visualizations, with precise queries pending in the background. Specifically, for each of the charts with reference numbers 426 and 428, the "Loading exact data . . . " label indicates that the precise query engine is operating in the background to obtain precise results, and a precise visualization is forthcoming.

Referring again to FIG. 3, while the precise query result for query request number three is being obtained in the background, the data analyst continues his work by initiating additional query requests (318, 322) and the data visualization system process the additional requests, with the approximate query processing engine, to generate approximate visualizations. These approximate visualizations are returned to the client device (320, 324) for presentation to the data analyst, for example, via the approximate visualization panel 414.

After the passing of some time, the precise query result for the data analyst's third query request is completed, and the data visualization system communicates a precise visualization (326) for the query back to the client device, where it is presented to the data analyst. The precise visualization may be presented with the textual description of the data analyst's original observation—that is, the observation that the data analyst made and recorded (e.g., via text entry box 418) when viewing the approximate visualization for the query. Additionally, in some instances, the precise visualization may be presented in combination with the approximate visualization to allow the data analyst to make a comparison of the results. Furthermore, the precise visualization may be presented in a color or group of colors (e.g., color theme) that differs from the color or colors of the approximate visualization for the same query, ensuring that the data analyst does not confuse the two resulting visualizations.

FIG. 4 is a user interface diagram illustrating a user interface (400) for a data visualization system that facilitates visualization techniques, consistent with embodiments of the present invention. The user interface is generally composed of three primary components or panels—the query specification and refinement panel (402), the approximate visualization panel (414), and the precise visualization panel (422). In general, a data analyst interacts with the query specification and refinement panel by providing inputs that will define queries and associated query parameters. The approximate visualization panel, which in this example is the largest of the panels, is used to rapidly and iteratively present approximate visualizations from which the data analyst can draw or infer data observations. The precise visualization panel (422), presented on the far right, provides a mechanism by which the data analyst can verify (or disprove) data observations that have been made, based on approximate visualizations. Accordingly, the data analyst can selectively request precise visualizations for only certain queries, where the uncertainty suggests to the data analyst a precise visualization may be necessary to confirm (or disprove) an observation.

Consistent with some embodiments of the present invention, a measure of expected error (uncertainty) is conveyed with each approximate visualization in the approximate visualization panel. The exact manner in which the measure of expected error is conveyed may vary, depending upon the specific type of data visualization being presented. For instance, a bar chart may include with each bar in the chart a line representing a confidence interval for that group (bar). Additionally, the distribution uncertainty—a measure of the uncertainty across all groups in a result—may be presented. With some visualization types, for example, such as heatmaps, a separate visualization may be presented in combination with the approximate visualization, to convey the measure of error. An example of the uncertainty associated with a heatmap is provided in the user interface shown in FIG. 4 by the parallel heatmap with reference number 416. The data analyst can utilize the expected error measures presented with each approximate visualization to make a decision as to whether or not to request a precise result to confirm an observation.

In many of the examples presented herein, the sequence of events is described such that the request to generate a precise visualization is received subsequent to the presentation of the approximate visualization. For example, in many instances, the data analyst will only want to request a precise visualization after viewing the approximate visualization. However, in some alternative embodiments, the approximate and precise visualizations may be generated in parallel, in response to the same request. For example, in some instances, a data analyst may require for a specific query that the approximate and precise results be generated in parallel. In those instances, typically the approximate visualization will be generated and presented first, while the precise results are computed in the background and then the precise visualization is presented at the completion of the precise query processing. Furthermore, in some instances, the presentation of the visualization for the precise results may update dynamically in real time as results are being generated. For instance, the visualization may continuously change over time during the precise query processing, until completion of the precise query processing. In such a case, the formatting and labelling of the visualization would make it clear that the visualization is pending, while the precise query processing is continuing.

Figure 5:
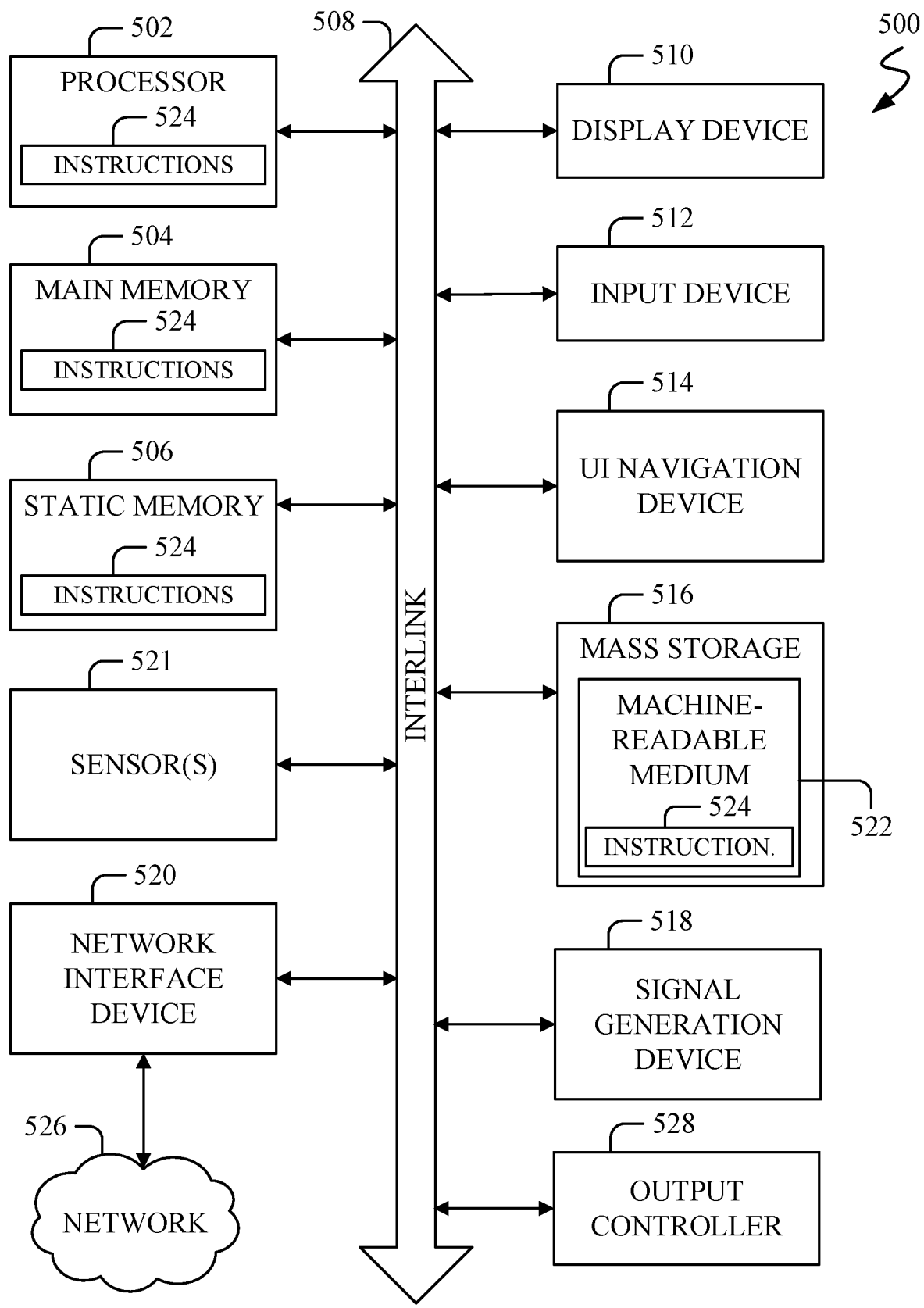
FIG. 5 is a system diagram illustrating an example of a computing device with which, embodiments of the present invention might be implemented.

FIG. 5 is a block diagram illustrating an example of a machine upon which one or more example embodiments may be implemented. In alternative embodiments, the machine (500) may operate as a standalone device or may be connected (e.g., networked) to other machines. In a networked deployment, the machine (500) may operate in the capacity of a server machine, a client machine, or both in server-client network environments. In an example, the machine (500) may act as a peer machine in peer-to-peer (P2P) (or other distributed) network environment. The machine (500) may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine (500) is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating in an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) (500) may include a hardware processor (502) (e.g., a central processing unit (CPU), a graphics processing unit (GPU), a hardware processor core, or any combination thereof), a main memory (504) and a static memory (506), some or all of which may communicate with each other via an interlink (e.g., bus) (508). The machine (500) may further include a display device (510), an alphanumeric input device (512) (e.g., a keyboard), and a user interface (UI) navigation device (514) (e.g., a mouse). In an example, the display device (510), input device (512) and UI navigation device (514) may be a touch screen display. The machine (500) may additionally include a mass storage device (e.g., drive unit) (516), a signal generation device (518) (e.g., a speaker), a network interface device (520), and one or more sensors (521), such as a global positioning system (GPS) sensor, compass, accelerometer, or other sensor. The machine (500) may include an output controller (528), such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device (516) may include a machine-readable medium (522) on which is stored one or more sets of data structures or instructions (524) (e.g., software) embodying or utilized by any one or more of the techniques or functions described herein. The instructions (524) may also reside, completely or at least partially, within the main memory (504), within static memory (506), or within the hardware processor (502) during execution thereof by the machine (500). In an example, one or any combination of the hardware processor (502), the main memory (504), the static memory (506), or the storage device (516) may constitute machine-readable media.

While the machine-readable medium (522) is illustrated as a single medium, the term "machine-readable medium" may include a single medium or multiple media (e.g., a centralized or distributed database, and/or associated caches and servers) configured to store the one or more instructions (524).

The term "machine-readable medium" may include any medium that is capable of storing, encoding, or carrying instructions (524) for execution by the machine (500) and that cause the machine (500) to perform any one or more of the techniques of the present disclosure, or that is capable of storing, encoding or carrying data structures used by or associated with such instructions (524). Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions (524) may further be transmitted or received over a communications network (526) using a transmission medium via the network interface device (520) utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device (520) may include one or more physical jacks (e.g., Ethernet, coaxial, or phone jacks) or one or more antennas to connect to the communications network (526). In an example, the network interface device (520) may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions (524) for execution by the machine (500), and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and unless otherwise stated, nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method to be performed by a data visualization system, the method comprising:

receiving, from a client application, a query to be executed against a dataset;

processing the query against a representative subset of the dataset to generate an approximate query result, and from the approximate query result, an approximate visualization;

communicating the approximate visualization to the client application for presentation within a user interface;

responsive to receiving a request to generate a precise visualization for the query, processing the query against the entire dataset to generate a precise query result, and from the precise query result, a precise visualization for the query;

communicating the precise visualization for the query to the client application for presentation within the user interface;

subsequent to communicating the approximate visualization for the query and responsive to receiving the request to generate the precise visualization for the query, communicating information to the client application that causes the approximate visualization to be presented, within the user interface, in a list of visualizations corresponding to queries for which requests to generate precise visualizations have been received; and for each visualization in the list, presenting the visualization in a first color to indicate that the visualization is an approximate visualization, based on an approximate query result, or a second color to indicate that the visualization is a precise visualization, based on a precise query result.

2. The method of claim 1, wherein processing the query against a representative subset of the dataset to generate an approximate query result includes processing the query against a sample of the dataset that has a sample size that has been algorithmically determined to ensure query processing against the sample of the dataset is completed within a predetermined maximum query processing time.

3. The method of claim 1, wherein processing the query against a representative subset of the dataset to generate an approximate query result includes processing the query against a sample of the dataset that has a sample size that has been algorithmically determined to ensure that a measure for the magnitude of possible error in the approximate query result, compared to the precise query result, does not exceed a predetermined error threshold.

4. The method of claim 1, wherein the precise visualization for the query is generated to include the approximate visualization, or some portion thereof, superimposed over the precise visualization, thereby enabling a comparison of query results.

5. The method of claim 1, wherein communicating the precise visualization for the query to the client application for presentation within the user interface includes causing the precise visualization for the query to be presented with the approximate visualization, thereby enabling a side-by-side comparison of query results.

6. The method of claim 1, further comprising:
communicating information, representing an end-user selectable graphical user interface element, to the client application for presentation within the user interface, wherein, upon detecting selection of the end-user selectable graphical user interface element by an end-user at the client application, a request to generate the precise visualization for the query is generated and communicated from the client application to the data visualization system.

7. The method of claim 6, further comprising:
communicating information, representing a text entry box, to the client application for presentation within the user interface, wherein, upon detecting selection of the end-user selectable graphical user interface element by an end-user at the client application, text entered into the text entry box is communicated from the client application to the data visualization system and stored in association with the approximate visualization.

8. The method of claim 1, wherein the approximate visualization and the precise visualization are one of a: bar chart, histogram, scatter plot, network, streamgraph, or heatmap.

9. A data visualization system comprising:
a data processing unit, and
a computer-readable medium storing instructions, which, when executed by the data processing unit, cause the data visualization system to perform operations that:
receive, from a client application, a query to be executed against a dataset;
process the query against a representative subset of the dataset to generate an approximate query result, and from the approximate query result, an approximate visualization;
communicate the approximate visualization to the client application for presentation within a user interface;
responsive to receipt of a request to generate a precise visualization for the query, process the query against the entire dataset to generate a precise query result, and from the precise query result, a precise visualization for the query;
communicate the precise visualization for the query to the client application for presentation within the user interface;
subsequent to communicating the approximate visualization for the query and responsive to receiving a request to generate a precise visualization for the query, communicate information to the client application that causes the approximate visualization to be presented, within the user interface, in a list of visualizations corresponding to queries for which requests to generate precise visualizations have been received; and
for each visualization in the list, presenting the visualization in a first color to indicate that the visualization is an approximate visualization, based on an approximate query result, or a second color to indicate that the visualization is a precise visualization, based on a precise query result.

10. The data visualization system of claim 9, wherein the operation to process the query against a representative subset of the dataset to generate an approximate query result causes the data visualization system to process the query against a sample of the dataset that has a sample size that has been algorithmically determined to ensure query processing against the sample of the dataset is completed within a predetermined maximum query processing time.

11. The data visualization system of claim 9, wherein the operation to process the query against a representative subset of the dataset to generate an approximate query result causes the data visualization system to process the query against a sample of the dataset that has a sample size that has been algorithmically determined to ensure that a measure for the magnitude of possible error in the approximate query result, compared to the precise query result, does not exceed a predetermined error threshold.

12. The data visualization system of claim 9, wherein the precise visualization for the query is generated to include the approximate visualization, or some portion thereof, superimposed over the precise visualization, to enable a comparison of query results.

13. The data visualization system of claim 9, wherein the operation to communicate the precise visualization for the query to the client application for presentation within the user interface further comprises:
causing the precise visualization for the query to be presented with the approximate visualization, to enable a side-by-side comparison of query results.

14. The data visualization system of claim 9, comprising additional instructions, which, when executed by the data processing unit, cause the data visualization system to perform operations that:
communicate information, representing an end-user selectable graphical user interface element, to the client application for presentation within the user interface, wherein, upon detecting selection of the end-user selectable graphical user interface element by an end-user at the client application, a request o generate a precise visualization for the query is generated and communicated from the client application to the data visualization system.

15. The data visualization system of claim 14, comprising additional instructions, which, when executed by the data processing unit, cause the data visualization system to perform operations that:

communicate information, representing a text entry box, to the client application for presentation within the user interface, wherein, upon detecting selection of the end-user selectable graphical user interface element by an end-user at the client application, text entered into the text entry box is communicated from the client application to the data visualization system and stored in association with the approximate visualization.

16. The data visualization system of claim 9, wherein the approximate visualization and the precise visualization are one of a: bar chart, histogram, scatter plot, network, streamgraph, or heatmap.

17. A non-transitory computer readable storage medium storing instructions thereon, which, when executed by a processing device of a computer system, cause the computer system to perform operations, the operations comprising:

receiving, from a client application, a query to be executed against a dataset;

processing the query against a representative subset of the dataset to generate an approximate query result, and from the approximate query result, an approximate visualization;

communicating the approximate visualization to the client application for presentation within a user interface;

responsive to receiving a request to generate a precise visualization for the query, processing the query against the entire dataset to generate a precise query result, and from the precise query result, a precise visualization for the query;

communicating the precise visualization for he query to the client application for presentation within the user interface;

subsequent to communicating the approximate visualization for the query and responsive to receiving a request to generate a precise visualization for the query, communicate information to the client application that causes the approximate visualization to be presented, within the user interface, in a list of visualizations corresponding to queries for which requests to generate precise visualizations have been received; and for each visualization in the list, presenting the visualization in a first color to indicate that the visualization is an approximate visualization, based on an approximate query result, or a second color to indicate that the visualization is a precise visualization, based on a precise query result.

18. The computer readable storage medium of claim 17, storing additional instructions thereon, which, when executed by a processing device of the computer system, cause the computer system to perform additional operations comprising:

communicating information, representing an end-user selectable graphical user interface element, to the client application for presentation within the user interface, wherein, upon detecting selection of the end-user selectable graphical user interface element by an end-user at the client application, a request to generate the precise visualization for the query is generated and communicated from the client application to the data visualization system; and communicating information, representing a text entry box, to the client application for presentation within the user interface, wherein, upon detecting selection of the end-user selectable graphical user interface element by an end-user at the client application, text entered into the text entry box is communicated from the client application to the data visualization system and stored in association with the approximate visualization.

* * * * *